United States Patent [19]

Paquette

[11] Patent Number: 5,004,209
[45] Date of Patent: Apr. 2, 1991

[54] DRY DISCONNECT COUPLING AND SAFETY CAP FOR PORTABLE TANKS

[75] Inventor: Louis J. Paquette, New Baltimore, Mich.

[73] Assignee: E. I. du Pont de Nemours and Company, Wilmington, Del.

[21] Appl. No.: 490,922

[22] Filed: Mar. 9, 1990

Related U.S. Application Data

[63] Continuation-in-part of Ser. No. 365,592, Jun. 13, 1989, abandoned.

[51] Int. Cl.⁵ ............................................. F16K 51/00
[52] U.S. Cl. ..................................... 251/144; 251/90; 251/152; 251/339
[58] Field of Search ............... 251/339, 291, 144, 152, 251/89.5, 90, 215; 137/316, 588, 630.15; 215/215

[56] References Cited

U.S. PATENT DOCUMENTS

| 754,618 | 3/1904 | Smith et al. | 137/588 |
|---|---|---|---|
| 2,438,776 | 3/1948 | Boylan | 251/339 |
| 3,211,419 | 10/1965 | Klinger-Lohr | 137/630.15 |
| 3,473,569 | 10/1969 | Guertin et al. | 137/614.06 |
| 4,101,000 | 7/1978 | Scully | 184/1.5 |
| 4,431,023 | 2/1984 | Johnson | 137/316 |

FOREIGN PATENT DOCUMENTS 1155836 6/1969 United Kingdom ................ 137/316

Primary Examiner—A. Michael Chambers
Attorney, Agent, or Firm—James T. Corle

[57] ABSTRACT

A dry disconnect coupling and a safety cap for portable tanks are disclosed. The disconnect coupling includes a fitting flange to be mounted to the drain of the tank, a plug movably secured in the flange and having flow and non-flow positions, and a coupling which lockingly engages with the flange and cooperates with the plug. The coupling includes a plug drive pin and a valve disposed coaxially therein. Individual drive knobs are provided for the plug drive pin and valve to cause axial translation thereof relative to the coupling and to each other. The safety cap includes a fitting flange to be mounted to the drain of the tank, a plug movably secured in the flange, and a coupling which lockingly engages with the flange and cooperates with the plug. The safety cap insures the proper, secure, and tight positioning of the plug in the fitting flange and maintains it in the non-flow position.

68 Claims, 15 Drawing Sheets

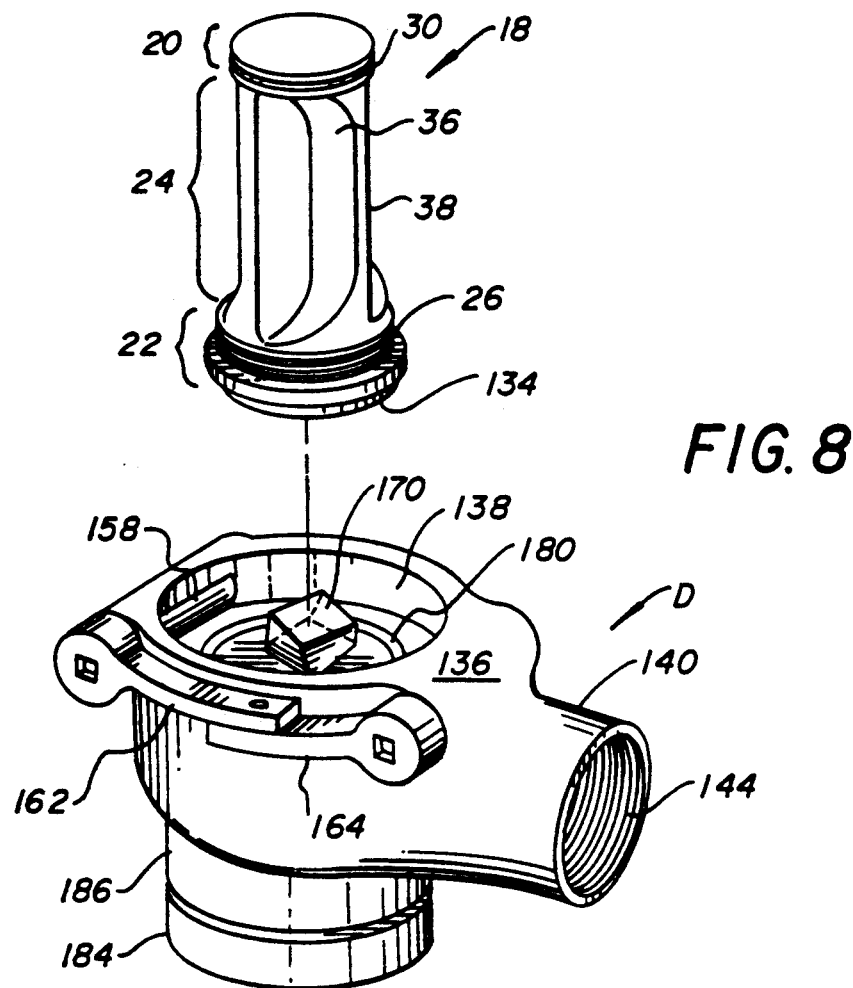
FIG. 8
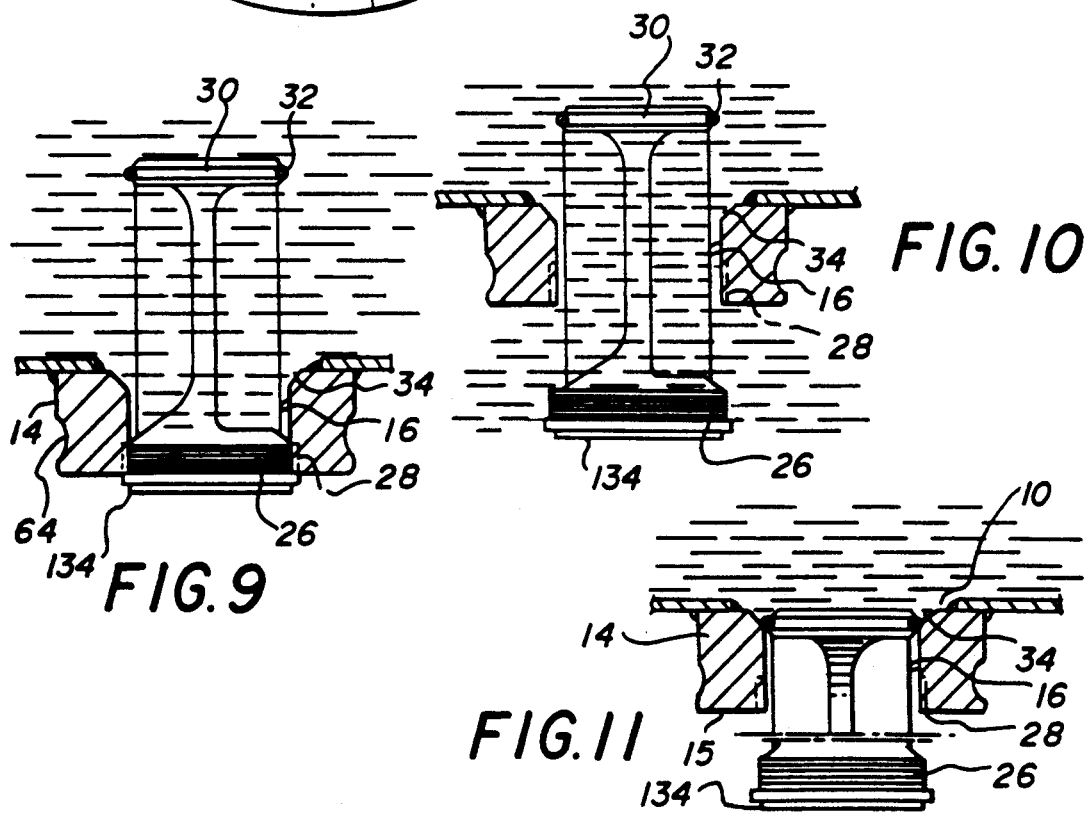
FIG. 10
FIG. 9
FIG. 11

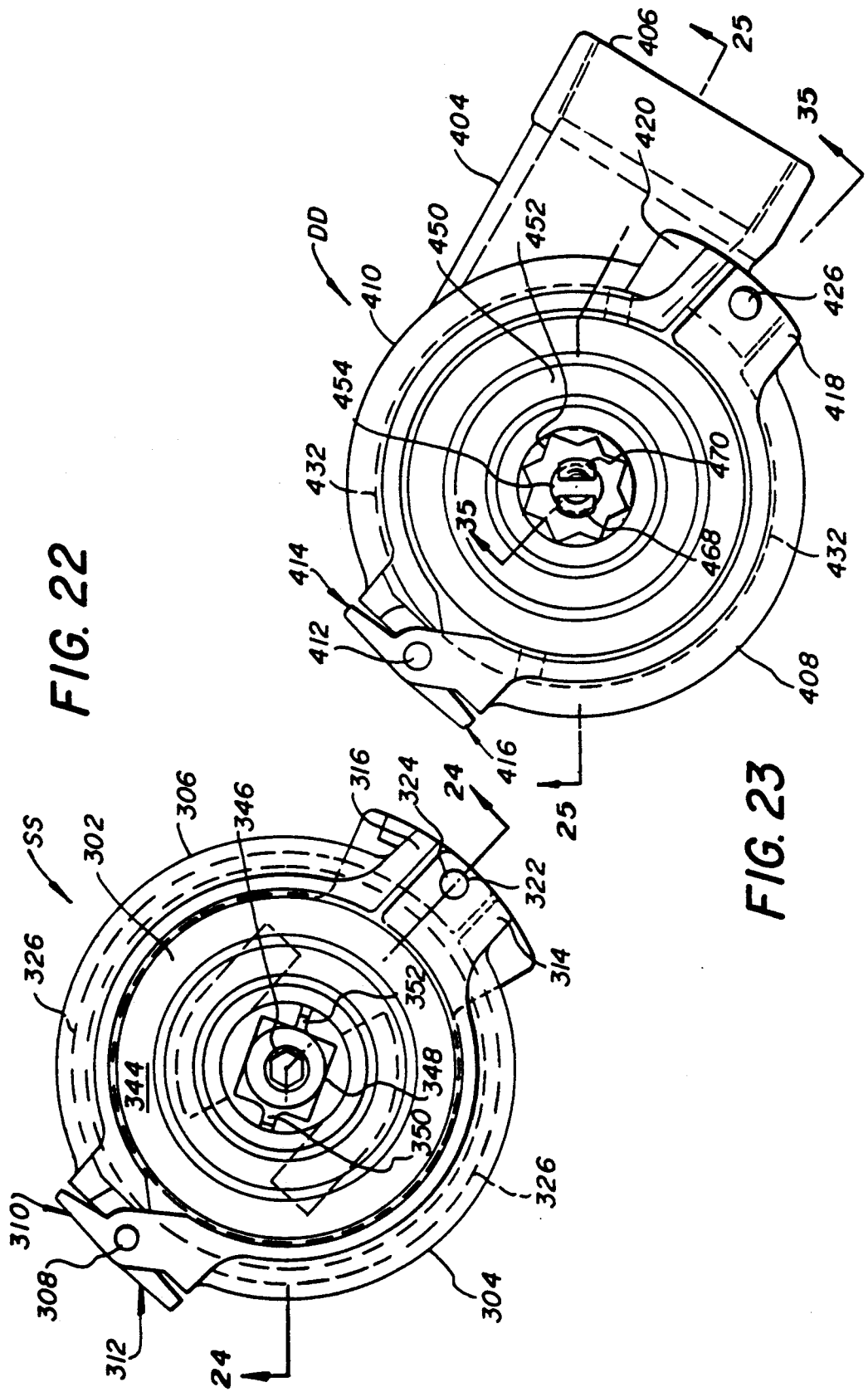

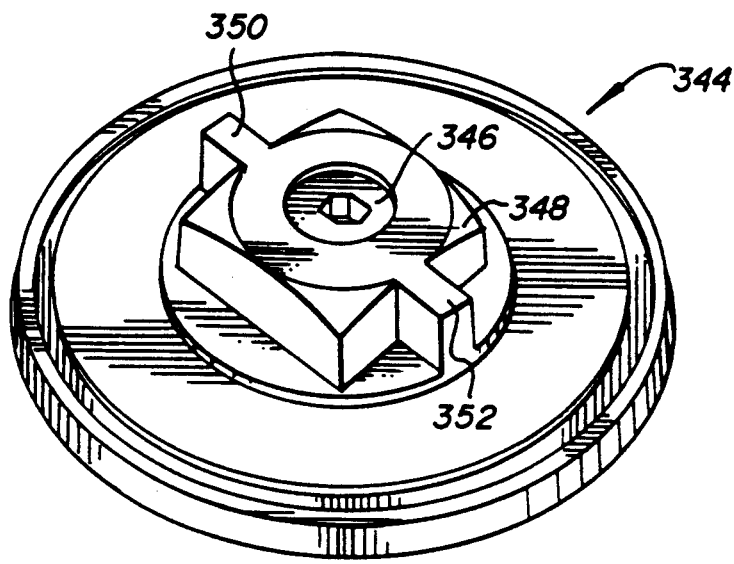
FIG. 28
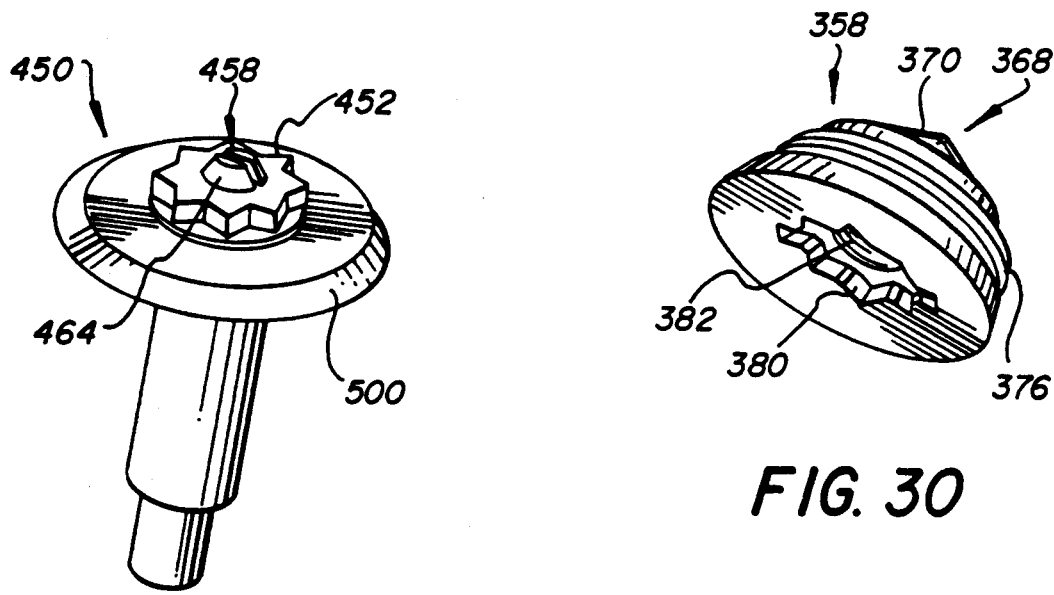
FIG. 29
FIG. 30

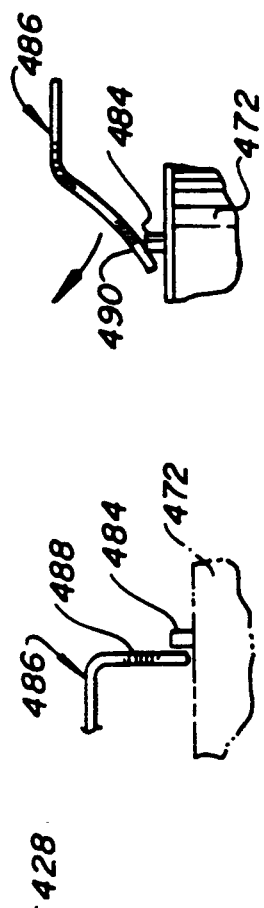
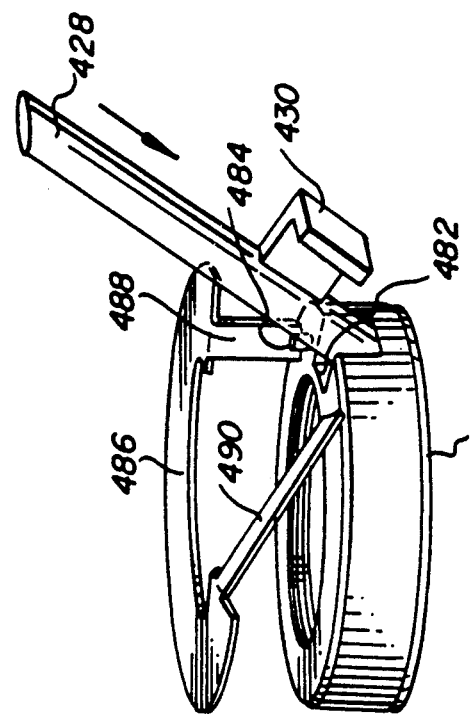
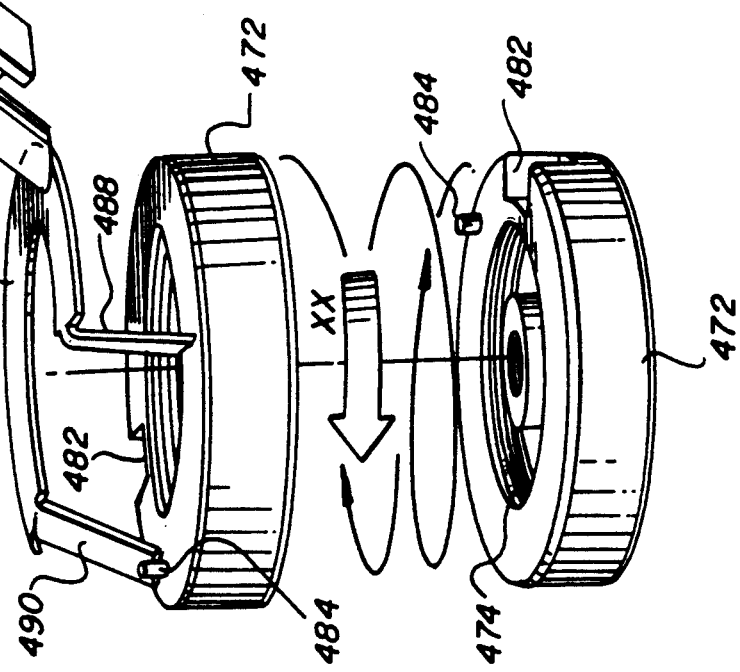

DRY DISCONNECT COUPLING AND SAFETY CAP FOR PORTABLE TANKS

RELATED APPLICATION

This is a continuation-in-part of U.S. patent application Ser. No. 07/365,592, filed by the subject inventor on June 13, 1989 now abandoned.

FIELD AND HISTORICAL BACKGROUND OF THE INVENTION

The present invention is directed to coupling devices, and more particularly to a dry disconnect coupling for draining fluid from tanks, containers or the like, and a safety cap therefore.

Various fluid coupling devices have been devised in the art. However, the coupling devices currently in use suffer from a serious disadvantage in that a considerable quantity of fluid is lost during uncoupling of such devices. The use of the conventional fluid coupling devices is especially undesirable in the instances where a particular tank contains fluids which are of a dangerous nature. Another problem associated with these coupling devices is that it is relatively easy to actuate the cooperating coupling member while they are being uncoupled and thereby lose fluid therefrom.

In addition, some of these devices require a number of complicated interlocks and valves to guard against inadvertent or accidental opening and to make certain that the fluid will flow therethrough when the cooperating coupling members are fastened together in fluid flow position. However, such interlocks are expensive to manufacture and require complex assembly and operating procedures. Another problem that has been observed in the use of these fluid coupling devices is that the valves tend to leak due to improper reassembly, and various other parts which are critical for the operation thereof tend to crack and leak due to over-the-road vibrations encountered during transporting of the tanks.

Finally, the conventional coupling devices do not offer adequate protection from an accidental or unexpected fluid spill in the instances where the flow actuating lever or the like may have been left in the flow position and results in the loss of a substantial quantity of fluid when, for example, the safety cap is removed by a user at a different location. The accidental spill is not only an economic loss in terms of the lost fluid, but could also be hazardous to individuals handling the tanks when the fluid is of a dangerous or harmful nature.

An example of a coupler device is disclosed in U.S. Pat. No. 3,473,569.

Object and Summary of The Invention

The principal object of the present invention is to provide a dry disconnect coupling device for draining fluid from a tank that overcomes the disadvantages associated with conventional coupling devices. In accordance with this objective, the present invention offers a dry disconnect coupling device which costs substantially less to manufacture and to maintain, is durable, safe and easy to use in connection with the drain of a tank, and is efficient. The invention further provides a safety closure cap that may be secured to the drain of the tank while being transported from one location to another.

The dry disconnect coupling device of the present invention includes a plug which is movably secured in a receiver flange or sleeve that preferably is mounted to the drain of a tank bottom. The safety cap is secured over the receiver flange and cooperates with the plug. The safety cap which is used during transporting of the tanks, includes plug securing means to insure that the plug is secure in the receiver flange and is properly seated and secured against rotation therein. The cap includes locking-cams to mount it securely over the receiver flange and can be easily removed therefrom by actuating the cam levers and rotating the cap to the left, i.e., clockwise.

In an alternative embodiment of the safety cap, wrap-around clamping arms are provided that mount the cap securely over the receiver flange. A locking pin is inserted through the free ends of the clamping arms to fasten them together.

The dry disconnect coupling device of the invention which is used in conjunction with the plug secured in the receiver flange includes a coupling which may be actuated to cause the plug to assume either the flow position or the non-flow position. The coupling includes plug drive means to release the plug from the receiver flange to thereby obtain the plug flow position. A valve cooperates with the plug and seals the opening of the coupling to the drain of the tank. Each of the plug drive means and the valve includes knobs for causing axial translation of the plug drive and the valve relative to the coupling and to each other.

In alternative embodiment of the dry-disconnect coupling, a valve cooperates with a two-part plug and seals the opening of the coupling to the drain of the tank. The valve includes a knob for causing axial translation of the plug drive relative to the coupling.

BRIEF DESCRIPTION OF THE DRAWINGS

The above and other objects and advantages and novel features of the present invention will become apparent from the following detailed description of the preferred embodiment of the invention illustrated in the accompanying drawings, wherein;

FIG. 8 is a perspective view of the dry disconnect coupling shown with the plug;

FIGS. 9-11 illustrate in partial sections the non-flow, flow, and emergency non-flow positions of the plug, respectively;

FIG. 22 is a top plan view of an alternate embodiment of the safety cap;

FIG. 23 is a top plan view of an alternate embodiment of the drain of the dry-disconnect coupling, shown without the plug;

FIG. 28 is an enlarged perspective elevational view of an alternate embodiment of the plug checker plate;

FIG. 29 is an enlarged perspective elevational view of an alternate embodiment of the valve;

FIG. 30 is an enlarged bottom perspective view of the lower section of the plug;

FIGS. 31–34 illustrate relative positions of the lock ring, lock pin and the knob sections in the plug flow and non-flow positions;

DETAILED DESCRIPTION OF THE INVENTION

Figure 1:
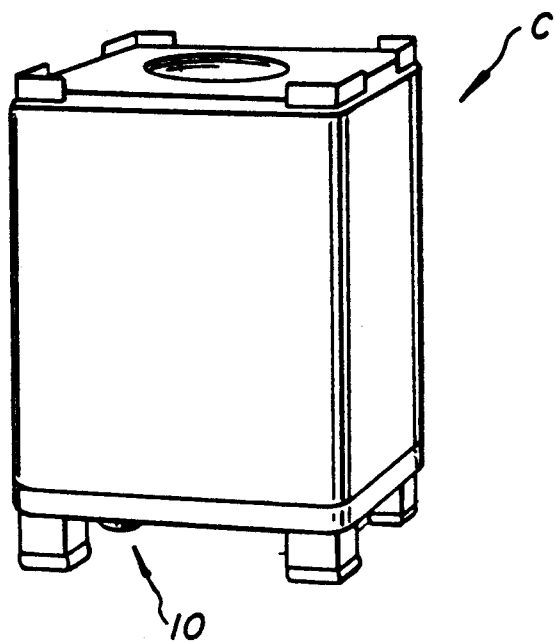
FIG. 1 is a perspective view of a portable tank for containing the fluid.
Figure 2:
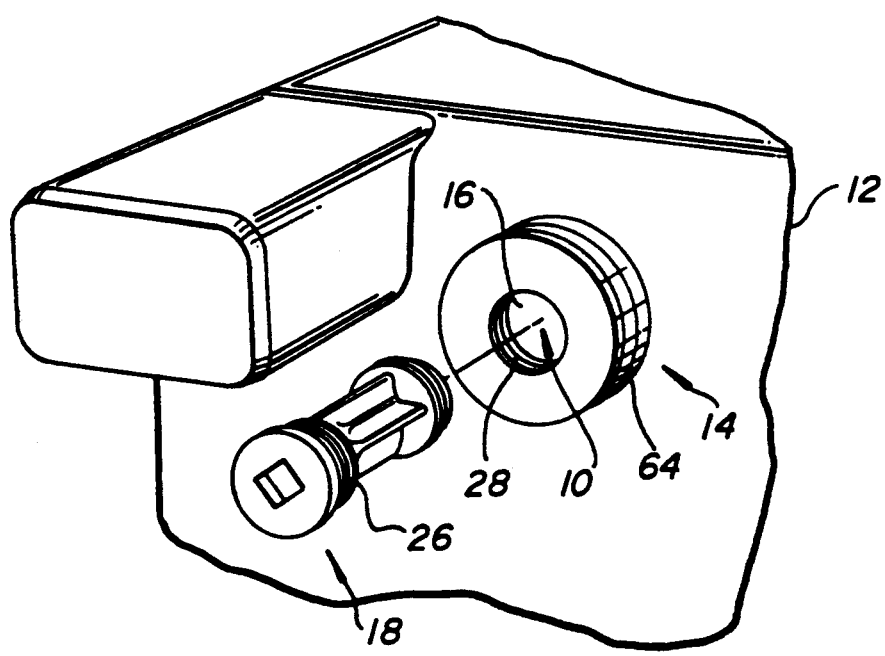
FIG. 2 is a partial, enlarged bottom plan view of FIG. 1 showing the plug and the receiver flange.

As illustrated in FIGS. 1 and 2, a portable tank or container C includes drain 10 disposed in the bottom 12 thereof. A receiver flange or sleeve 14 is mounted over drain 10 so that sleeve channel 16 is in fluid communication with the interior of the tank (FIGS. 9–11). A cylindrically shaped plug 18 is disposed in sleeve channel 16.

As best shown in FIG. 8, plug 18 includes top section 20 and bottom section 22, which include therebetween a body section 24. Bottom section 22 includes screw-threads 26 which engage with corresponding screw-threads 28 provided on the internal periphery of receiver flange 14 (FIGS. 2 and 9–11). The top section 20 of plug 18 includes groove 30 which extends around the perimeter thereof and receives therein an O-ring 32 (see FIG. 10). The O-ring 32 is provided to seal receiver flange opening 34 when plug 18 assumes the emergency non-flow position, shown in FIG. 11 and described below. Alternatively, plug 18 either assumes non-flow (FIG. 9) or flow positions (FIG. 10), described below.

The body section 24 of plug 18 includes generally C-shaped inwardly cut-in recesses 36 separated by vertically extending walls 38. The recesses 36 disposed alternatingly with walls 38 extend axially substantially the length of body section 24, and when plug 18 assumes the flow position, (described below in more detail, and shown in FIG. 10), recesses 36 define a continuous flow path for the fluid from container C to dry disconnect coupling D and to the exterior.

Typically, container C would be filled with a fluid, such as paint, and transported to another location where the fluid would be drained out from the container for further use. Prior to transporting the fluid filled container, safety cap S would be placed over receiver flange 14 to insure that the plug 18 remains secure, properly seated and secured against rotation, in the tank bottom in the non-flow position (FIGS. 5 and 9), to avoid accidental spill of the fluid.

Figure 3:
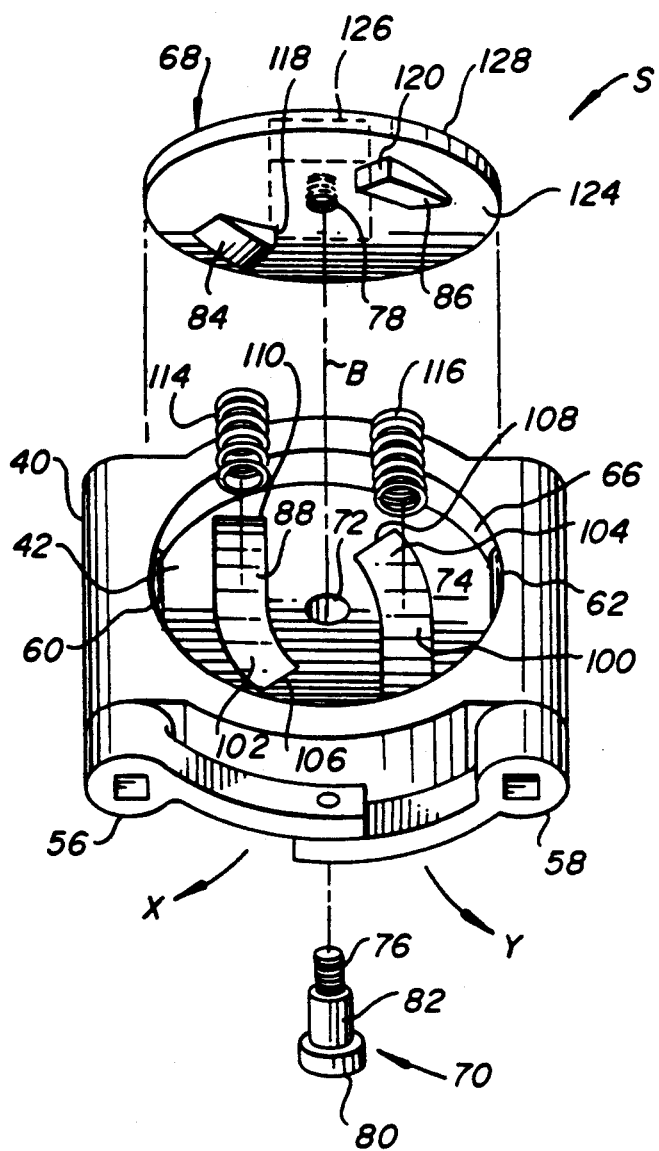
FIG. 3 is an exploded view of the safety cap of the invention.
Figure 4:
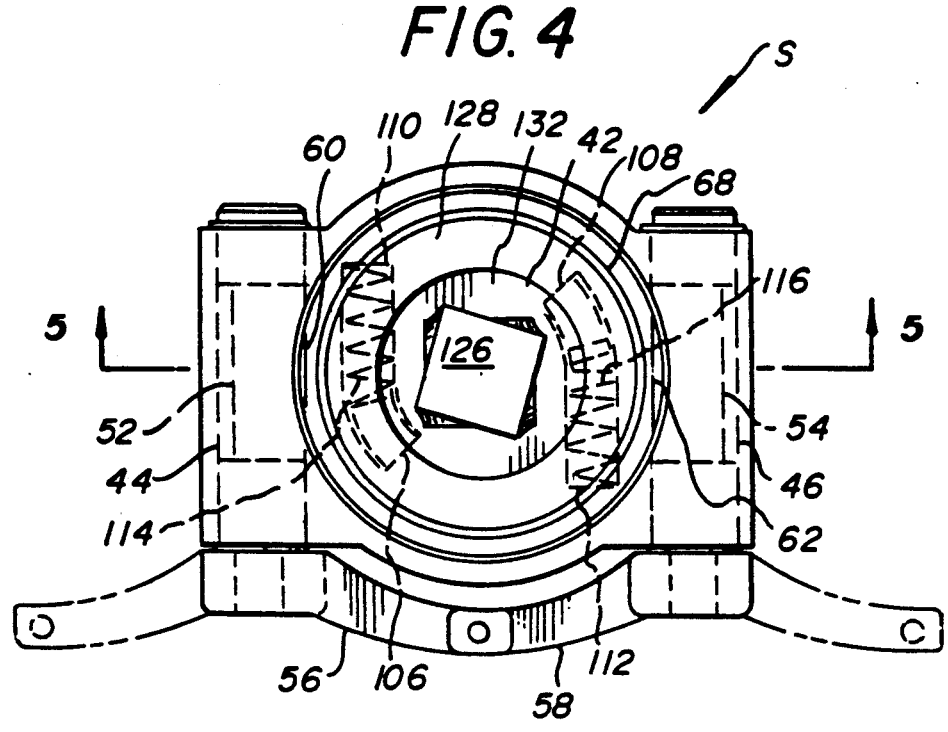
FIG. 4 is a top plan view of the safety cap, showing in broken lines the alternate, unlock position of the cam levers.
Figure 5:
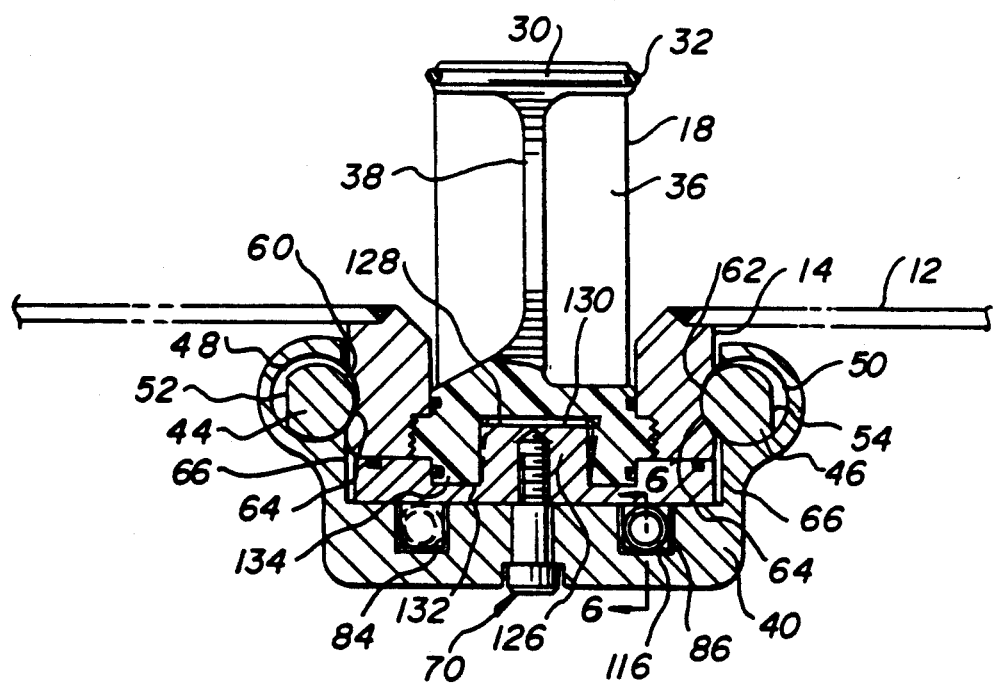
FIG. 5 is a view taken along line 5—5 of FIG. 4, after the safety cap is installed over the receiver flange on the tank bottom.

As best shown in FIGS. 3–5, safety cap S includes a generally cup-shaped coupling 40 that defines recess 42 therein. Left and right locking cam pins 44 and 46 are provided in the upper peripheral portion of coupling 40 and are disposed diametrically opposite and extend generally parallel to each other in corresponding grooves 48 and 50 (FIG. 5). Each locking cam pin 44 and 46 includes a generally planar surface 52 and 54, respectively, and can be rotated in corresponding grooves 48 and 50 by respective cam levers 56 and 58 (FIG. 4) to assume lock or unlock positions. As shown in FIG. 5, when planar surfaces 52 and 54 of locking cams 44 and 46 face away from receiver flange 14, the curved portions 60 and 62 lying opposite to the planar surfaces 52 and 54, lockingly engage with groove 64 disposed on the external perimeter of receiver flange 14 and safety cap S assumes the lock position. On the other hand, when planar surfaces 52 and 54 face the receiver flange 14, the locking cams 44 and 46 no longer engate with groove 64 and safety cap S assumes the unlock position and may be removed from receiver flange 14.

It should be noted that the relative position of cam levers 56 and 58, as shown in FIG. 3, corresponds to the locking and engaging position of cams 44 and 46 shown in FIG. 5. Accordingly, it would be apparent to those of ordinary skill in the art that cam levers 56 and 58 would have to be turned away from each other by about 180 degrees from their positions shown in FIG. 3, to obtain the unlock position of safety cap S where planar surfaces 52 and 54 would be in general vertical alignment with internal perimeter wall 66 of coupling 40. It should also be noted that the diameter of grooves 48 and 50 is slightly greater than the diameter of locking cams 44 and 46 in order to insure free rotation of the locking cams therein.

As shown in FIG. 3, a generally circular plug checker plate 68 is disposed within recess 42 of cap coupling 40 and is held therein by a screw-fastener 70 received in a centrally disposed hole 72 in the inside bottom 74 of coupling 40. The screw 70 includes a threaded section 76 which is received in a corresponding screw-threaded hole 78 in plug checker plate 68. Further, screw 70 includes between its head 80 and threaded section 76, a substantially smooth shank section 82 that allows screw 70 to slide vertically about cap coupling axis B in hole 72. As described below, plug checker plate 68 assumes either the up or the down position relative to cap coupling 40.

Figure 7:
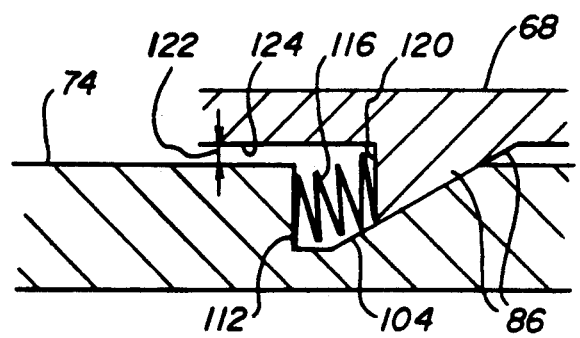
FIG. 7 is a view similar to FIG. 6, showing the alternate, up position of the plug checker plate.

The plug checker plate 68 is provided with two diametrically opposed cam-wedges 84 and 86, which are received in corresponding generally hook-shaped grooves 88 and 100 provided in the inside bottom 74 of cap coupling 40. The curved sections of grooves 88 and 100 include ramps 102 and 104, respectively, which slope down from groove ends 106 and 108 toward the other groove ends 110 and 112 (see FIG. 6, for example). It should be noted that the ramps 102 and 104, however, do not extend the entire length of corresponding grooves 88 and 100, but cover a substantial distance therein. The spring-like members 114 and 116 are biased between groove ends 110, 112 and vertical walls 118, 120 of cam wedges 84 and 86, respectively. Therefore, when plug checker plate 68 is mounted over coupling bottom 74, due to the force exerted by, for example, spring 116 against vertical wall 120, cam-wedge 86 rides up corresponding ramp 104 (FIG. 7). Similarly, the oppositely disposed cam-wedge 84 rides up corresponding ramp 102 due to the force exerted by spring 114. The net result is that plug checker plate 68 rotates to the right, i.e., counterclockwise, relative to cap coupling 40 and translates axially upwardly along central axis B of safety cap S and assumes the up position.

Figure 6:
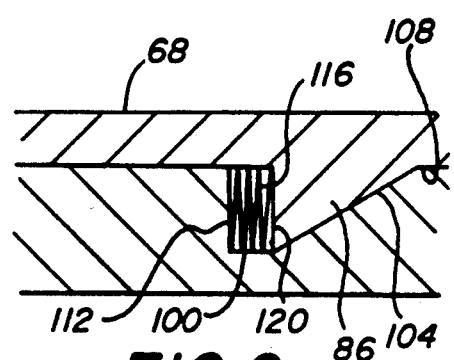
FIG. 6 is a partial, enlarged sectional view taken along line 6—6 of FIG. 5.

It should be noted, however, that the upward axial translation of plug checker plate 68 would be limited to the extent the screw-fastener 70 can slide in hole 72 simultaneously therewith. It should further be noted that if cap coupling 40 were now rotated to the right, while holding plug checker plate 68 stationary by applying a sufficient force to counteract the forces exerted by springs 114 and 116, cam-wedges 84 and 86 will ride down corresponding ramps 102 and 104, thereby compressing respective springs 114 and 116 (FIG. 6). This will cause plug checker plate 68 to translate axially downwardly to assume the down position due to its relative rotation in a direction opposite to the direction of rotation of the coupling 40, i.e., clockwise. Therefore, when plug checker plate 68 is in the up position, i.e., cam-wedges 84 and 86 riding up corresponding ramps 102 and 104, clearance 122 is created between inside bottom surface 74 and bottom surface 124 of checker plate 68 (FIG. 7).

As best shown in FIGS. 4 and 5, a generally square in cross-section male drive member 126 is disposed vertically centrally on top surface 128 of plug checker plate 68. The male drive member 126 is slightly twisted and is received in a corresponding female drive member or recess 130 in the bottom surface of plug 18. A ring-shaped groove 132 surrounds male drive member 126 and receives leg 134 of plug 18. Since recess 130 is twisted to the same degree as male drive member 126, when the two drive members mate properly, and the plug 18 is securely in place within receiver flange 14, plug checker plate 68 cannot rotate if cap coupling 40 is turned to the right in a counterclockwise direction. It should be noted, however, that if the cap coupling 40 were to be rotated in a clockwise direction, cam-wedges 84 and 86 would ride up corresponding ramps 102 and 104 and clearance 122 would be created due to the relative axial translation of plug checker plate 68 and cap coupling 40 in opposite directions (FIG. 3).

Figure 12:
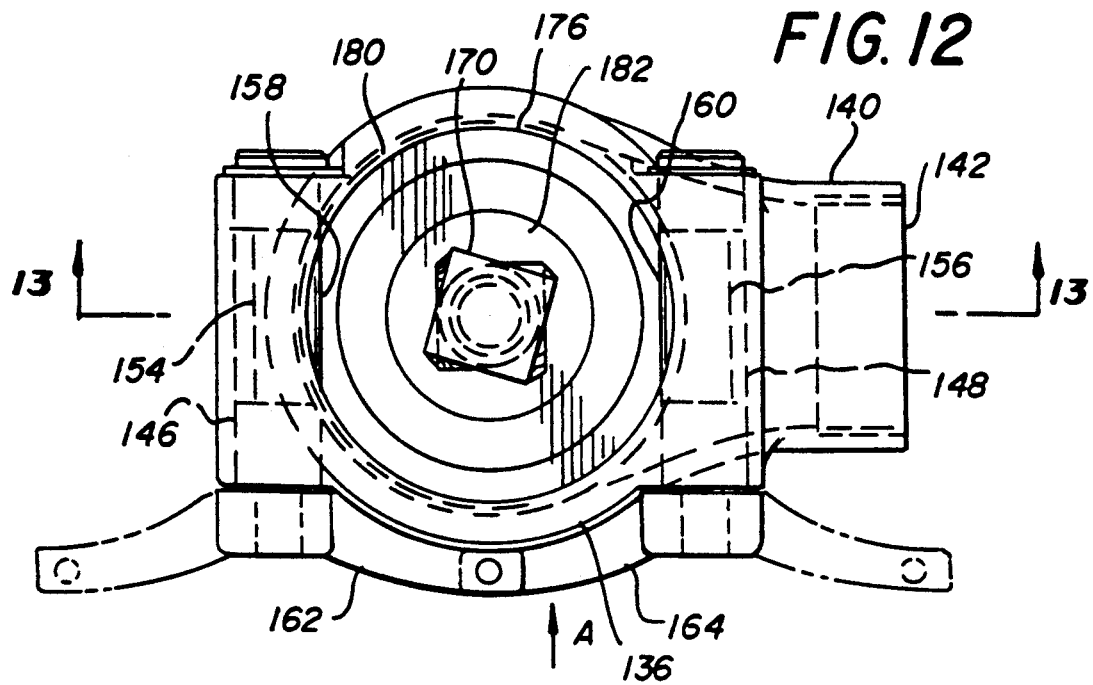
FIG. 12 is a top plan view of the dry disconnect coupling shown without the plug, showing in broken lines the alternate, unlock position of the cam levers.
Figure 13:
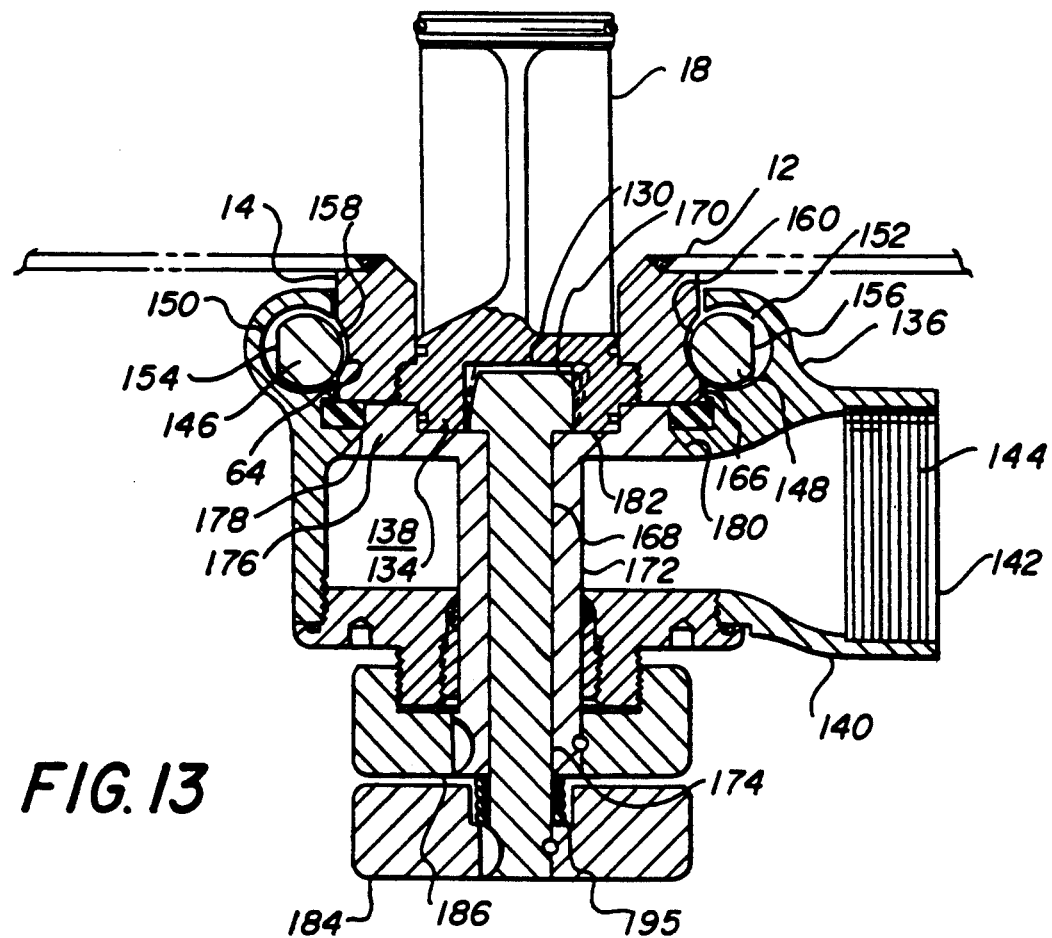
FIG. 13 is a view taken along line 13—13 of FIG. 12, after the coupling has been installed over the receiver flange on the tank bottom.

As shown in FIGS. 8, 12 and 13, the dry disconnect coupling D includes coupling member 136 defining therein a recess 138 which is in fluid communication with a side exit arm 140. The exit arm 140 communicates through exit opening 142 to the exterior and normally would be connected to a cooperating coupling of a hose or the like (not shown) for draining and transporting the fluid to a desired location. Although screw-threads 144 are preferably provided on the internal periphery of exit arm 140 adjacent exit opening 142, other conventional means may be used to make a fluid connection between coupling member 136 and the cooperating coupling.

As described above with respect to cap coupling 40, dry disconnect coupling 136 is also provided with locking cam pins 146 and 148 received in corresponding grooves 150 and 152 in the upper periphery thereof. As best shown in FIG. 13, locking cam pins 146 and 148 are diametrically opposed and run generally parallel to each other. As locking cams 44 and 46 of cap coupling 40, the locking cam pins 146 and 148 include planar surfaces 154 and 156, respectively, and corresponding diametrically opposite curved surfaces 158 and 160. When coupling member 136 is mounted over receiver flange 14, curved surfaces 158 and 160 engage with groove 64 therein to thereby lock coupling D onto the receiver flange 14 (FIG. 13).

In order to remove coupling member 136 from receiver flange 14, one simply rotates cam levers 162 and 164 away from each other and by about 180 degrees which, in turn, causes planar surfaces 154 and 156 of respective cams 146 and 148 to come in vertical planar alignment with internal vertical wall 166 of coupling 136. This results in disengagement of locking cams 146 and 148 from groove 64 and coupling 136 may then be removed. In this regard, it should be noted that the position of cam levers 162 and 164 relative to each other and to coupling 136, as shown in FIG. 8, corresponds with the locking position of cams 146 and 148, shown in FIG. 13. Precise alignment of cams 146 and 148 in the locking position is required for both cap S and disconnect coupling D. To this end, stop lobes (not shown) can be provided to ensure precise alignment.

Figure 16:
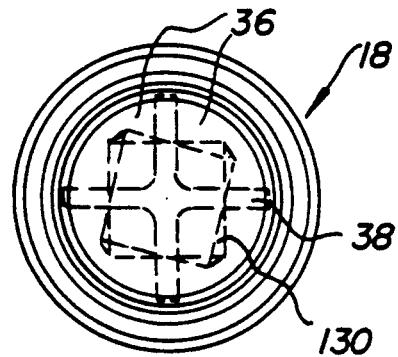
FIG. 16 is a top plan view of the plug.
Figure 17:
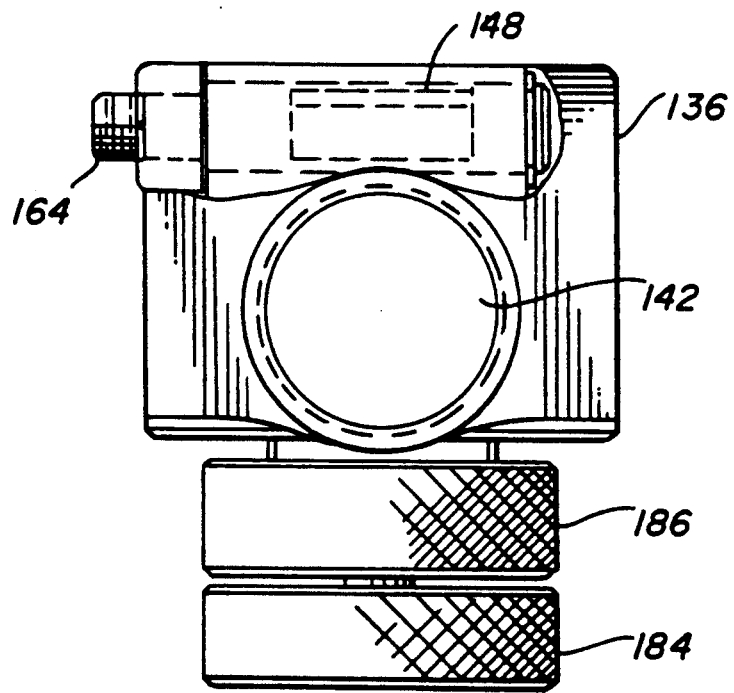
FIG. 17 is a side elevational view of the dry disconnect coupling with a portion broken away to show the position of a cam pin.

A plug drive pin 168 is disposed vertically in coupling 136 and includes male drive member 170, similar to the male drive member of cap coupling 40, which is received to be in tight engagement with female drive member or recess 130 of plug 18. As shown in FIGS. 12 and 13, male drive member 170 preferably is square in cross-section and is twisted. It should be noted that the degree of twist provided in male drive member 170 corresponds with the degree of twist in female drive member 130 (FIG. 16) so that when the two drive members are in proper mating alignment, there is almost zero or negligible play between them and plug drive pin 168 and plug 18 rotate simultaneously. A generally T-shaped valve 172 is disposed vertically co-axially with plug drive pin 168 in coupling 136. The valve 172 defines central channel 174 for receiving plug drive pin 168 therein. The upper portion of valve 172 defines a generally circular valve head 176 with a downwardly and outwardly extending slanted peripheral edge 178, which in the plug non-flow position, shown in FIG. 13, seals coupling opening 180, and in the plug flow position, shown in FIG. 14, unseals the same. A ring-shaped groove 182 surrounds male drive member 170 and receives plug leg 134.

Figure 14:
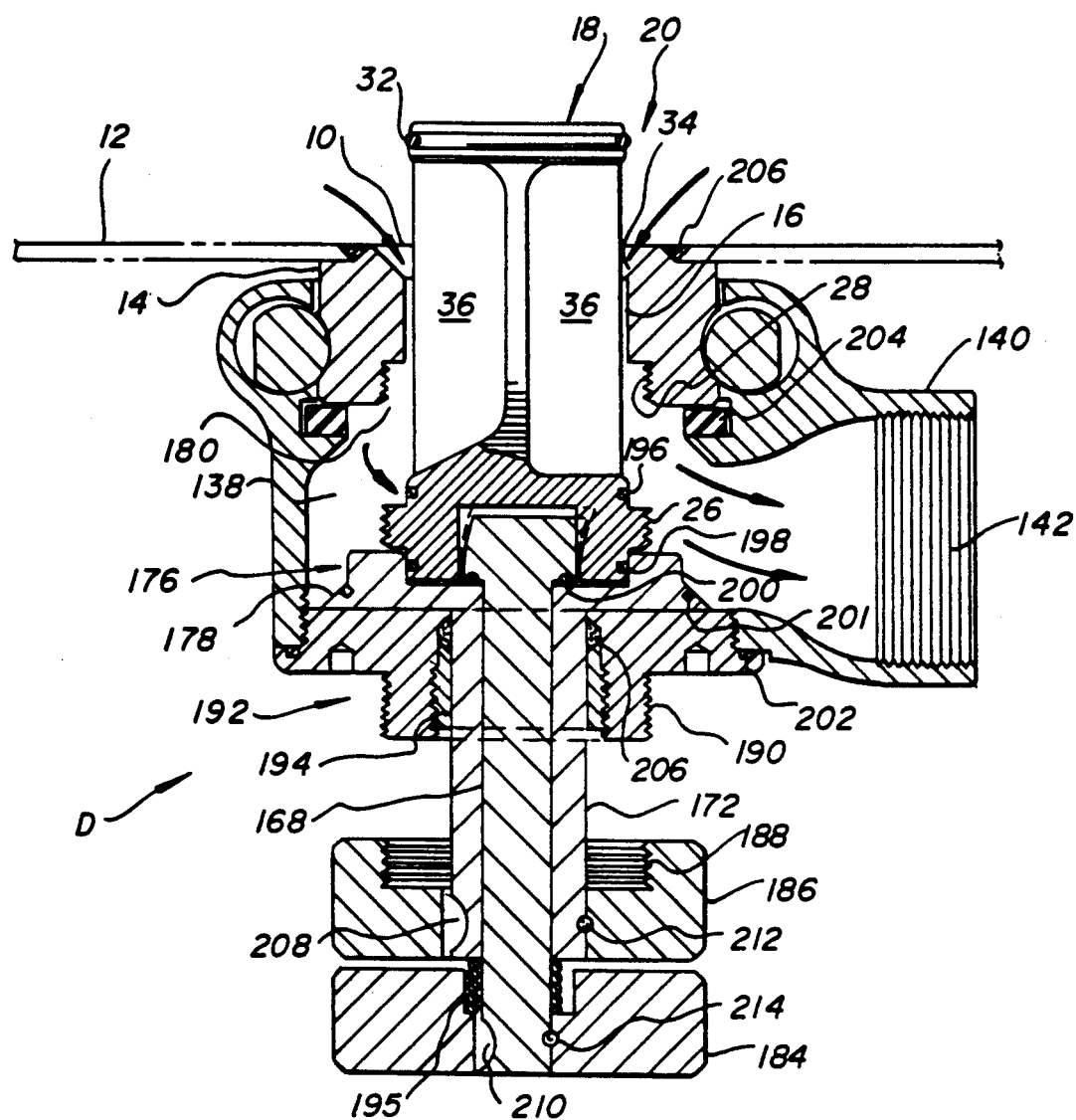
FIG. 14 illustrates in cross-section the fluid flow position of the plug when the dry disconnect coupling is in place over the drain of the tank.
Figure 15:
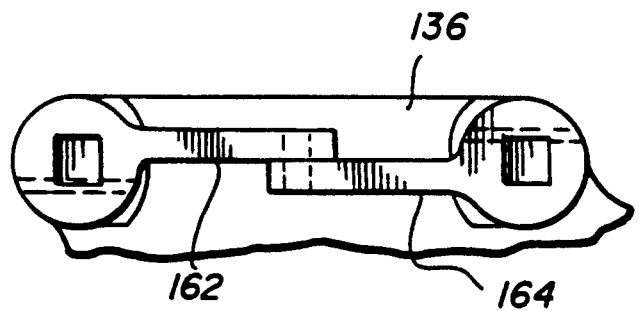
FIG. 15 illustrates the locking position of the cam levers viewed in direction of arrow A in FIG. 12.

Provided under coupling 136 are plug drive knob 184 and valve drive knob 186, which are in mechanical engagement with plug drive pin 168 and valve 172, respectively. As shown in FIG. 14, valve drive knob 186 is generally U-shaped in cross-section and includes screw-threads 188 along internal periphery that engage with corresponding screw-threads 190 on valve guide 192. In addition to defining the bottom of coupling 136, valve guide 192 maintains plug drive pin 168 and valve 172 in proper alignment with respect to plug 18. In order to align further plug drive pin 168 and valve 172, packing nut 194 is inserted between valve 172 and valve guide 192. A compression spring 195 is biased between drive knobs 184 and 186 for maintaining pressure on O-ring 200.

In FIG. 14, numerals 196, 198, 200, 201 and 202 indicate various resilient O-rings provided for proper sealing of various parts. Similarly, numeral 204 designates a gasket or the like and 206 indicates resilient packing made of a conventional material. Likewise, numerals 208 and 210 designate keys, and 212 and 214 designate pins, provided to secure plug drive pin 168 and valve 172 with their corresponding drive knobs 184 and 186.

ALTERNATE EMBODIMENT

Figure 24:
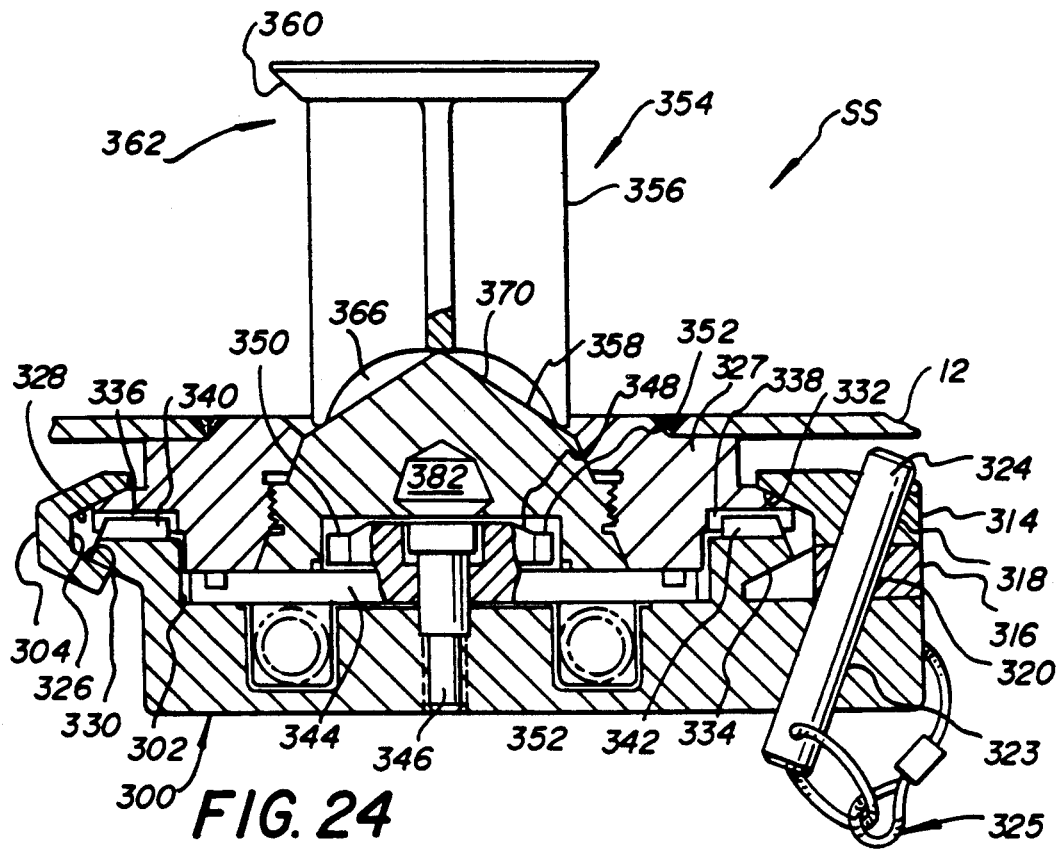
FIG. 24 is an enlarged sectional view taken along line 24—24 of FIG. 22, after the safety cap is installed over the receiver flange on the tank bottom.

As best shown in FIGS. 22 and 24, safety cap SS, in accordance with this embodiment, includes a generally cup-shaped coupling 300 that defines recess 302 therein. Left and right wrap-around, generally semicircular clamp arms 304 and 306 are provided in the upper peripheral portion of coupling 300 and are hinged together by pin 308 adjacent ends 310 and 312, respectively. The opposite free ends 314 and 316 of clamping arms 304 and 306, respectively, come together one atop the other so that the respective holes 318 and 320 therein are aligned with hole 322 in the coupling to form an inclined passageway 323 for accommodating locking pin 324 therein. The locking pin 324 is secured to coupling 300 by tether ring and line 325. Left and right clamping arms 304 and 306 are generally C-shaped in cross-section and each defines a groove 326 along the inside surface thereof. The groove 326 is bound on two sides by chamfered surfaces 328 and 330 that run along the substantial length of each clamping arm 304 and 306; and when safety cap SS is installed over receiver flange 327, surfaces 328 and 330 engage with chamfered shoulder flanges 332 and 334 of receiver flange 327 and coupling 300, respectively. As shown in FIG. 24, shoulder flange 332 includes left and right key slots 336 and 338 which correspond with and receive left and right tabs 340 and 342 of shoulder flange 334.

A generally circular plug checker plate 344, similar to the checker plate of the embodiment shown in FIGS. 3-5, is disposed within recess 302 of coupling 300 and is held therein by a conventional head-screw 346 in the same manner. The checker plate 344 is similar in configuration to checker plate 68 of the previous embodiment, with the exception of a square male drive member 348 which includes arms 350 and 352, extending in opposite directions along a common axis, as best shown in FIG. 28.

Figure 25:
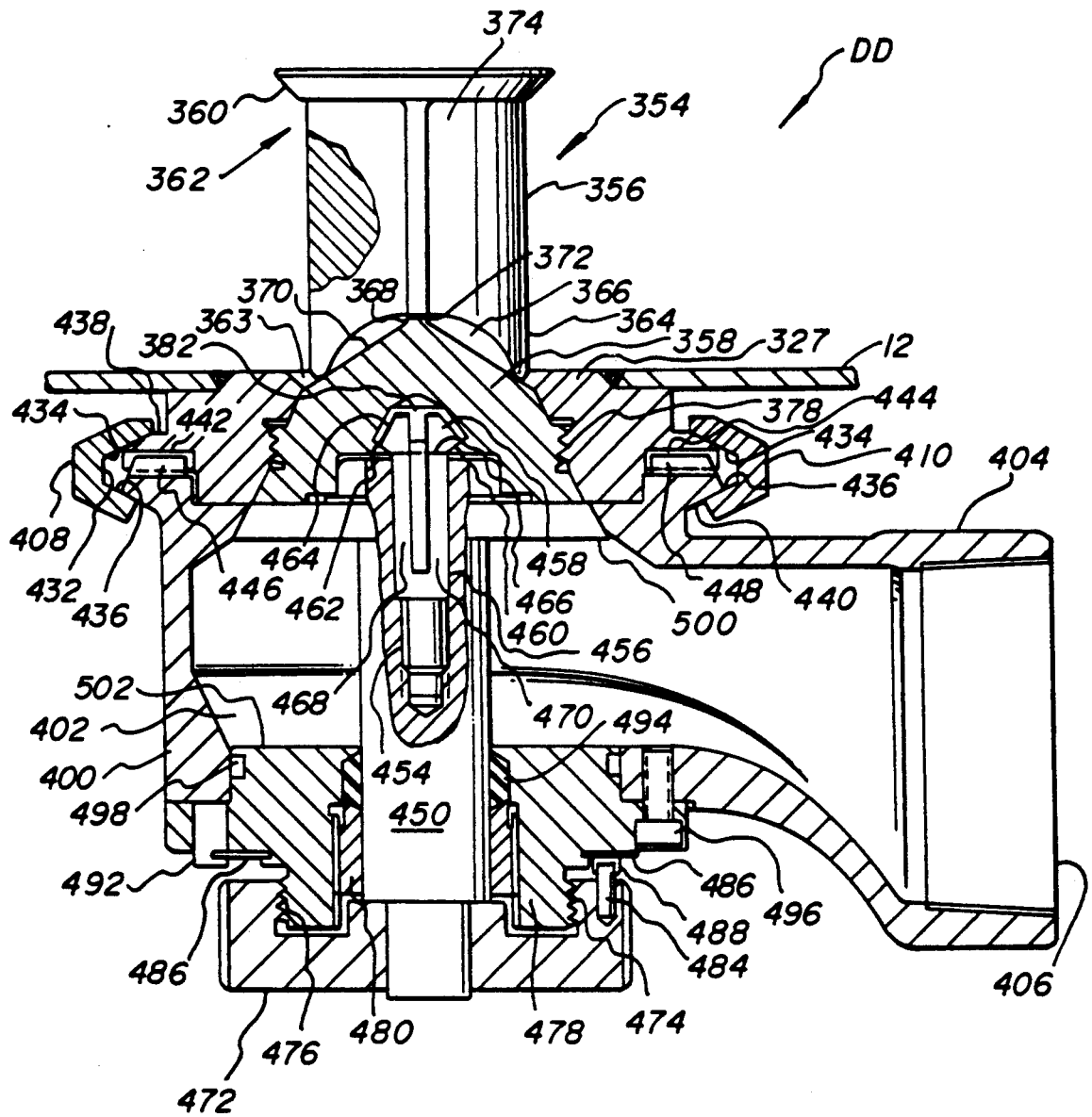
FIG. 25 is an enlarged sectional view taken along line 25—25 of FIG. 23, after the coupling has been installed over the receiver flange on the tank bottom.

The plug 354, in accordance with this embodiment shown in FIGS. 24-26 and FIG. 30, includes a generally cylindrical upper portion 356 and a generally dome-shaped lower portion 358. The upper portion 356 includes an inwardly extending inclined surface 360 at its top end 362 which seals receiver flange opening 363 when plug 354 assumes the non-flow position (shown in FIG. 11 with respect to the previously discussed embodiment). The bottom end 364 of upper portion 356 has the configuration of a leg and defines an internal recess 366 and as shown in FIG. 25, when upper portion 356 is placed over lower portion 358, the top 368 of dome-shaped lower portion 358 extends through recess 366, and leg 364 comes to rest on inclined surface 370 thereof. The upper and lower portions 356 and 358 are preferably welded at joint 372. The upper portion 356 is provided with inwardly cut flow recesses 374.

The lower portion 358 of plug 354, as best shown in FIG. 30, includes a screw-threaded portion 376 which engages with a corresponding screw-threaded portion 378 of the receiver flange 327. It should be noted that the pitch and the number of threads on portions 376 and 378 are identical in order to secure plug 354 in the receiver flange. A generally star-shaped recess 380 is provided in the bottom of lower portion 358 and receives male drive member 348 provided in safety cap SS or in dry disconnect coupling DD, described below. The lower portion 358 of the plug includes another generally dome-shaped recess 382 disposed above star-shaped recess 380.

Figure 26:
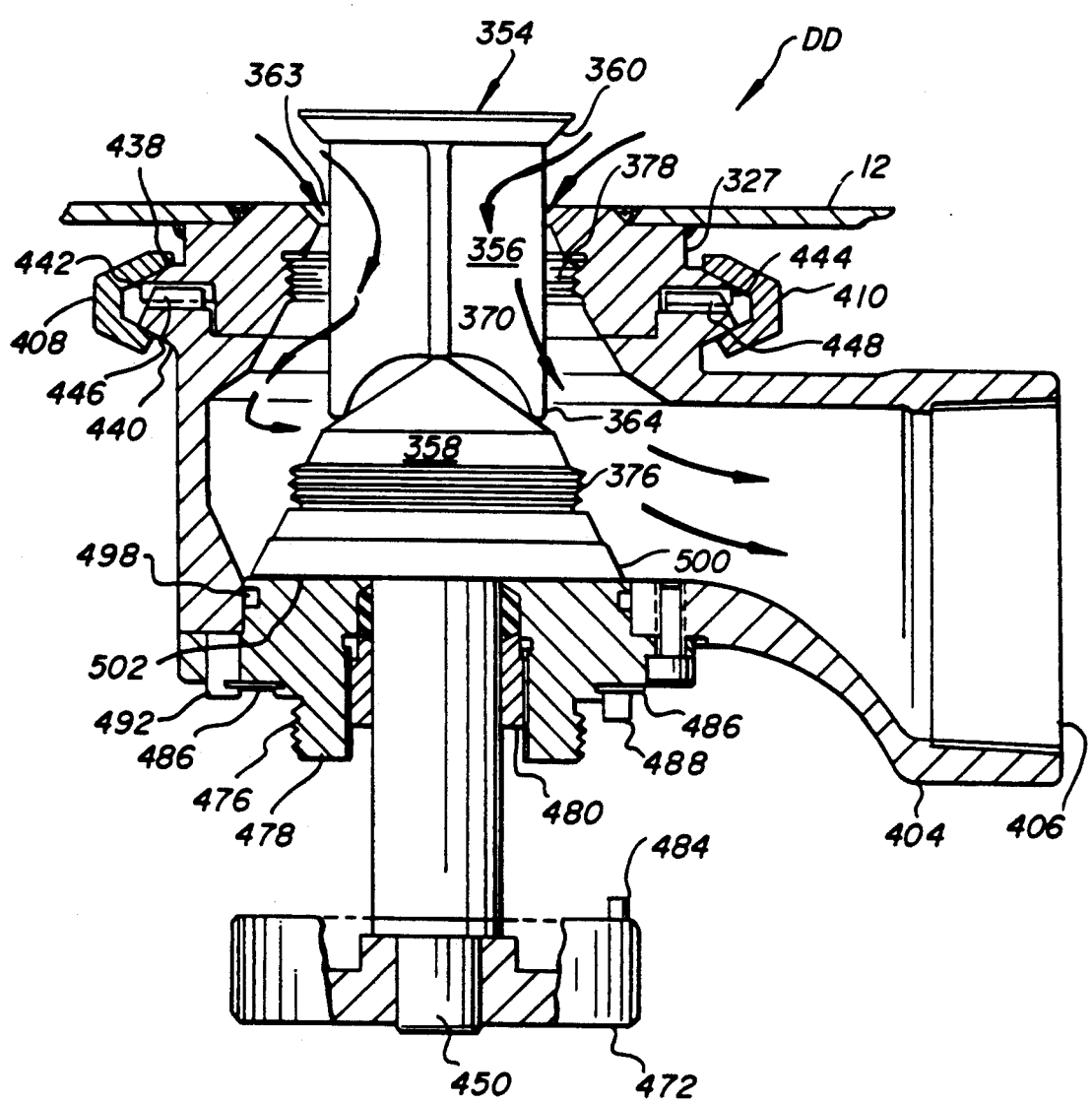
FIG. 26 illustrates in cross-section the fluid flow position of the plug when the dry-disconnect coupling is in place over the drain of the tank.
Figure 27:
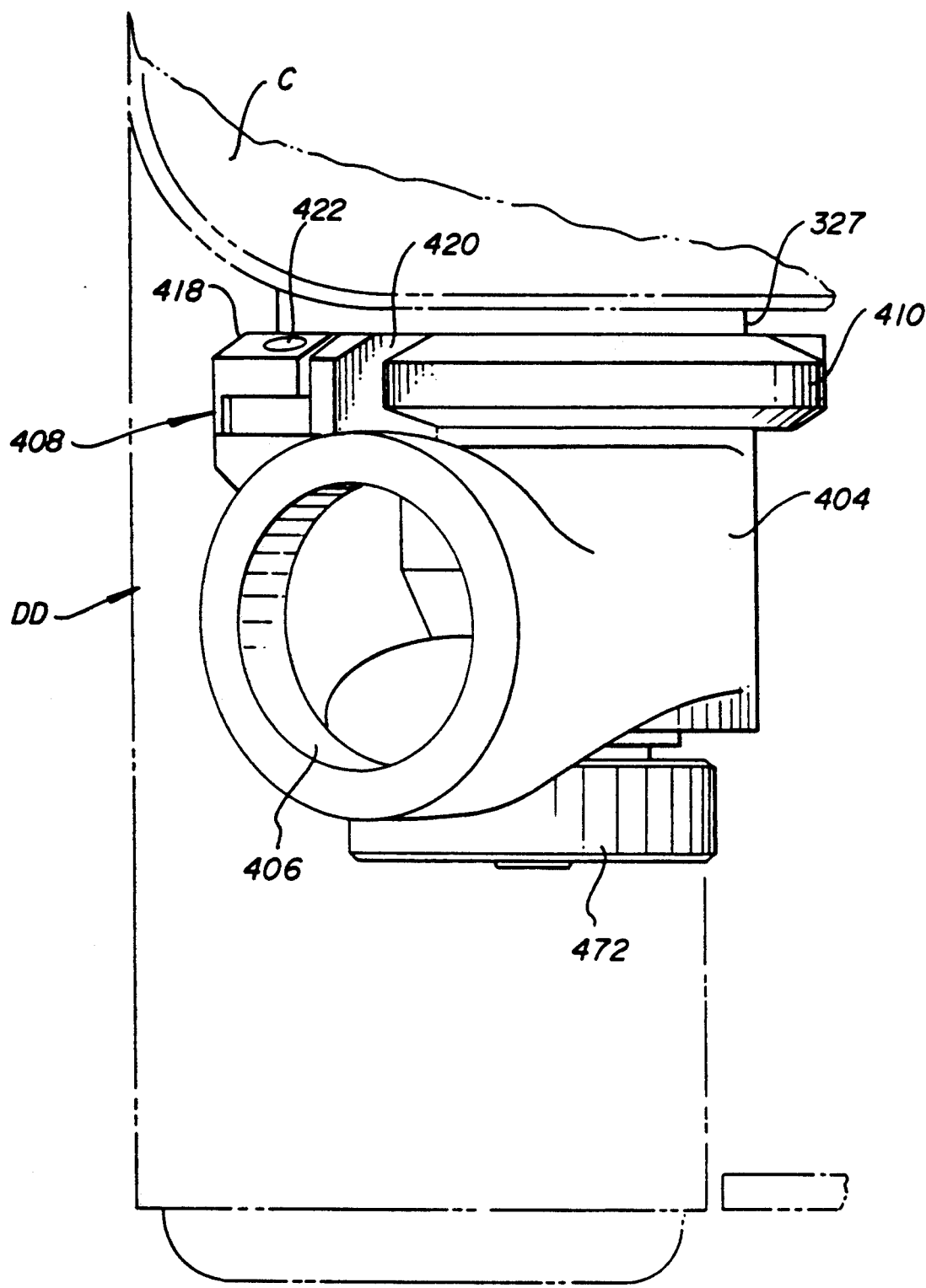
FIG. 27 is a side elevational view of the dry-disconnect coupling, shown installed over the receiver flange on the tank bottom.

As best shown in FIGS. 23 and 25-26, the dry disconnect coupling DD in accordance with the alternate embodiment, includes coupling member 400 defining inner recess 402 which is in fluid communication with a side exit arm 404. The exit arm 404 communicates through exit opening 406 to the exterior and normally would be connected to a cooperating coupling of a hose or the like (not shown) for draining and transporting the fluid to a desired location.

Figure 35:
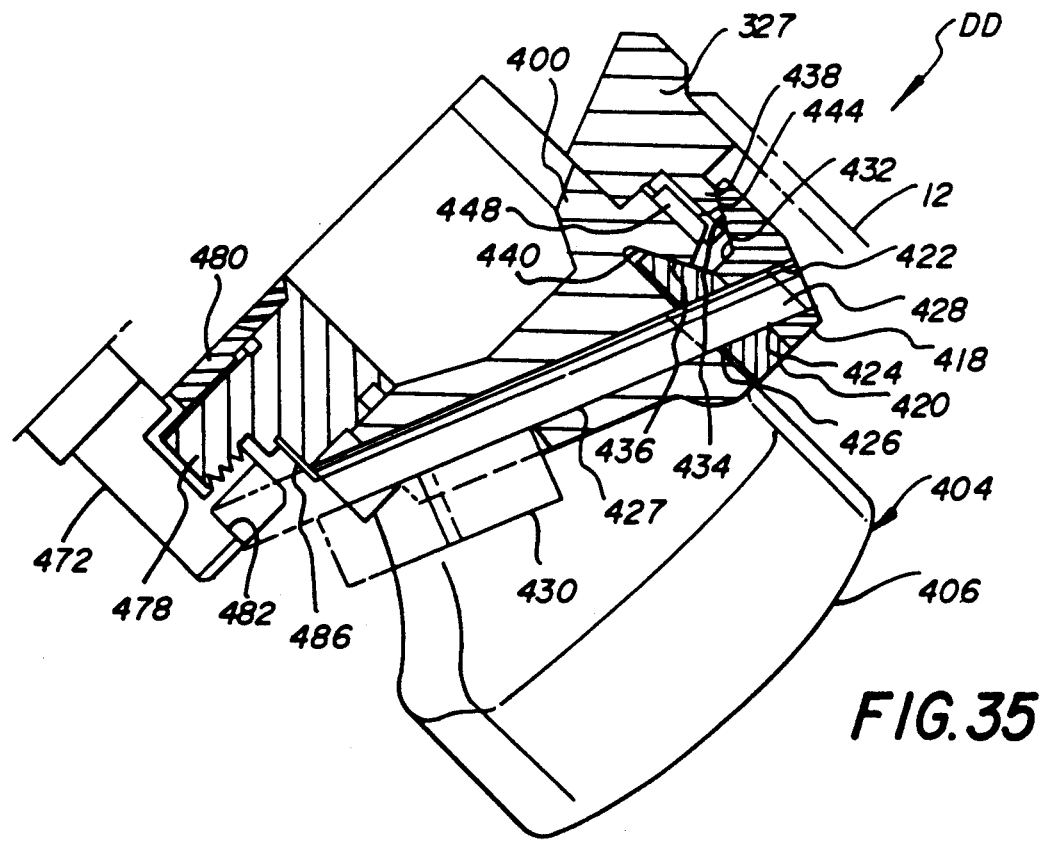
FIG. 35 is a partial cross-sectional view of the dry-disconnect coupling shown in FIG. 25, showing in phantom lines the position of the lock pin when the plug is in the non-flow position.

As described with respect to cap coupling 300, dry disconnect coupling 400 is also provided with left and right, wrap-around, and generally semicircular clamp arms 408 and 410 in the upper peripheral portion of coupling 400 and are pivotally hinged together by pin 412 adjacent ends 414 and 416, respectively. As shown in FIG. 35, the opposite free ends 418 and 420 of clamp arms 408 and 410, respectively, come together one atop the other so that the holes 422 and 424 therein are aligned with hole 427 in coupling 400 to form an inclined passageway 426 for accommodating lock pin 428 therein. As shown in FIGS. 31-32 and 35, lock pin 428 includes actuating handle 430 for sliding pin 428 in passageway 426.

Left and right clamp arms 408 and 410 are generally C-shaped in cross-section and each defines a groove 432 along the inside surface thereof. The groove 432 is bound on two sides by chamfered surfaces 434 and 436 that run along the substantial length of each clamping arm 408 and 410 and, when dry disconnect coupling DD is installed over receiver flange 327, chamfered surfaces 434 and 436 engage with corresponding chamfered shoulder flanges 438 and 440 of the receiver flange and coupling 400. As best shown in FIGS. 25-26, shoulder flange 438 includes left and right key slots 442 and 444 which correspond with and receive left and right tabs 446 and 448 of shoulder flange 440.

The left and right clamping arms 408 and 410 can be operated in a manner similar to the left and right clamping arms 304 and 306 of safety cap SS in order to mount or remove dry disconnect coupling DD from the receiver flange 327.

As shown in FIGS. 25-26 and 29, generally T-shaped plug drive valve 450 is disposed vertically in coupling 400 and includes a star-shaped male drive member 452 (similar to the male drive member 348 of cap coupling 300), which is received to be in tight engagement with a generally star-shaped female drive member or recess 380 in plug 354.

A plug retainer spring pin 454 is disposed centrally in plug drive valve 450, and includes bifurcated body and head sections 456 and 458, respectively. As best shown in FIG. 29, bifurcated head section 458 protrudes above and beyond star-shaped male drive member 452 and is received in dome-shaped recess 382 in plug 354. The head section 458 includes chamfered circumferential undersurface 460 which comes to be in sliding engagement with inclined surface 462 of recess 382. The head 458 further includes downwardly and outwardly inclined peripheral bevel surface 464.

It would be apparent to those of ordinary skill in the art that in order to mechanically fasten plug 354 with valve 450, one would need merely to force bifurcated head 458 through neck region 466 in plug lower portion 358. When head 458 is inserted through neck 466, fork arms 468 and 470 of pin 454 would be compressed together as neck 466 slides over bevel surface 464, thereby allowing it to enter recess 382. Once head 458 is fully within recess 382, arms 468 and 470 would spring back to their initial position, i.e., incompressed, and surface 460 the diameter of which is slightly larger than the diameter of neck 466, comes to rest on neck 466, thereby retaining plug 354 with valve 450. On the other hand, one need merely to pull down valve 450 in order to separate from plug 354. When valve 450 is pulled, surface 460 on pin 454 slides down on inclined surface 462 in recess 382, as fork arms 468 and 470 are again compressed and pin head 458 passes down through neck 466. In effect, the bifurcated portion of the retainer pin 454 functions as a compression spring.

Provided under coupling 400 is valve drive knob 472 which is in mechanical engagement with valve 450. As best shown in FIG. 26, knob 472 is generally U-shaped in cross-section and includes screw-threads 474 along internal periphery that engage corresponding screw-threads 476 on valve guide 478. In addition to defining the bottom of coupling 400, valve guide 478 maintains valve 450 in proper alignment with respect to plug 354. In order to align further valve 450, packing nut 480 is inserted between valve 450 and valve guide 478. As best shown in FIGS. 31 and 32, knob 472 is provided with a notch 482 at one corner of the periphery thereof and receives the bottom end of locking pin 428 therein. The knob 472 further includes an abutment pin 484 on the top surface thereof, the function of which is described below in more detail.

As best shown in FIGS. 25–26 and 31–32, a generally semi-circular lock ring with vertical and inclined tabs 488 and 490, respectively, is held by retainer pin 492 on the bottom of valve guide 478, and the function of which is described below in more detail. In FIGS. 25–26 and 35, numeral 494 designates a resilient packing made of a conventional material and 496 indicates a socket-head screw for fastening exit arm 404 to valve guide 478. Similarly, numeral 498 indicates an O-ring provided to obtain proper sealing between valve guide 478 and coupling 400.

It should be noted that the screw-threads 376, 378, 474 and 476, provided on plug 354, receiver flange 327, knob 472 and valve guide 478, are identical in all respects, such as pitch and number of revolutions, so that when knob 472 is turned tight and secure on valve guide 478, the plug 354 is correspondingly tight and secure in receiver flange 427.

USE AND OPERATION

Generally, container C prior to filling it with a fluid, would be installed with plug 18 in receiver flange 14 mounted in the bottom 12 thereof. Once the plug has been secured in receiver flange channel 16 by tightening, safety cap S may then be mounted thereon. Typically, before placing cap S, cam levers 56 and 58 would be turned so to assume the position shown in broken lines in FIG. 4, i.e., unlock position of cams 44 and 46.

In this position, the planar surfaces 52 and 54 of corresponding locking cams 44 and 46 would be in alignment with internal vertical wall 66 of cap coupling 40 and therefore, safety cap S may be easily slid over receiver flange 14.

Figure 18:
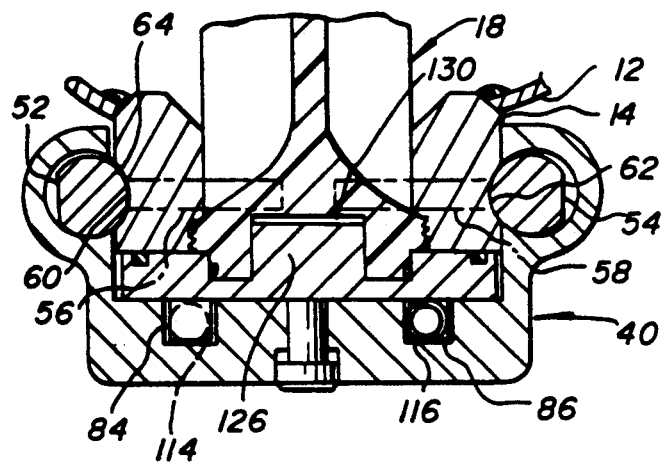
FIG. 18 illustrates in cross-section the proper, seated position of the plug in relation to the safety cap.

Under the normal circumstances, where plug 18 has been screwed in and is seated properly in the receiver flange 14 so as to be in proper alignment therewith as shown in FIG. 18, and cap coupling 40 is rotated to the right, then cam levers 56 and 58 would easily rotate to their initial locking position (FIG. 3) such that curved surfaces 60 and 62 would engage with groove 64 in receiver flange 14. However, if plug 18 is either absent from receiver flange 14 or has not been screwed in up to a desired point in sleeve channel 16, safety cap S of the invention is unique in that cam levers 56 and 58 could not be rotated in order for the curved surfaces 60 and 62 properly to engage groove 64 in receiver flange 14. This novel and extraordinary feature of safety cap S is illustrated in FIGS. 19–21 (only partial sectional views are shown for clarity).

Figure 19:
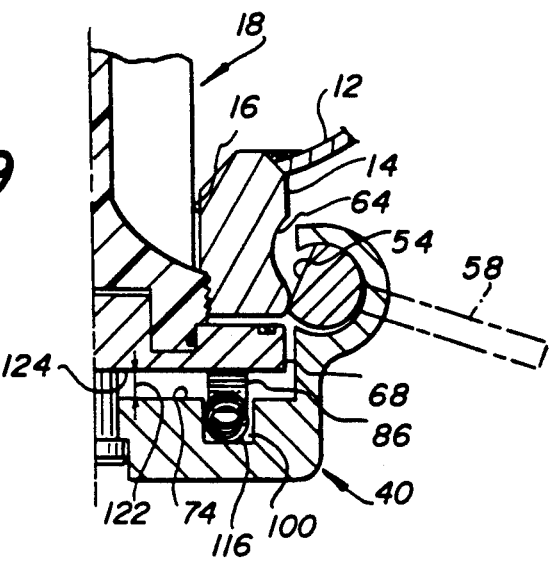
FIGS. 19–21 illustrate in partial cross-sections the improper seating and position of the plug relative to the plug checker plate and the safety cap.

For instance, FIG. 19 illustrates the proper and secure position of plug 18 in receiver flange 14. However, plug checker plate 68 is still in the up position due to cam wedges 84 and 86 riding up corresponding ramps 102 and 104. Therefore, due to the clearance 122 between bottom surface 124 of plug checker plate 68 and the inside bottom surface 74 of coupling 40, the coupling 40 cannot be pushed up in order to properly align planar surface 54 adjacent groove 64, as an end portion of surface 54 blocks a portion of receiver flange 14. However, if cap coupling 40 is rotated to the right to cause cam-wedges 84 and 86 to ride down ramps 102 and 104, clearance 122 would disappear and the cap coupling 40 can then be pushed up and cam levers 56 and 58 may be rotated to be in lock position (FIG. 18).

Figure 20:
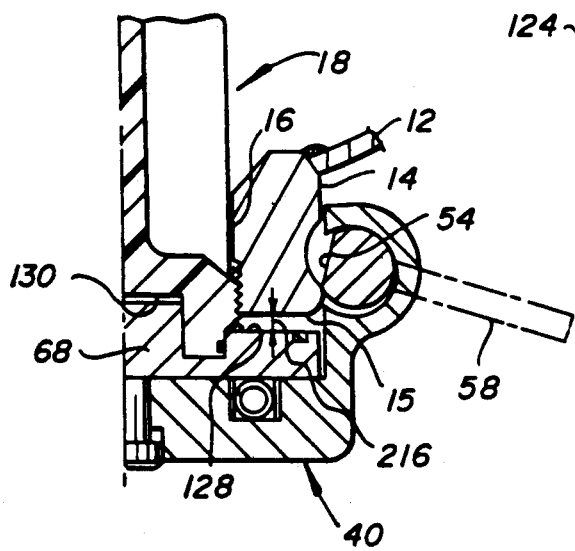

FIG. 20, on the other hand, illustrates the situation where plug 18 is not sufficiently screwed into sleeve channel 16, thereby providing clearance 216 between top surface 128 of plug checker plate 68 and bottom surface 15 of the receiver flange. Therefore, even if the clearance 122 (between bottom surface 124 of plug checker plate 68 and bottom 74 of cap coupling 40) is no longer present, this new clearance 216 presents essentially the same arrangement as in FIG. 19, as cam lever 58 cannot be rotated to mount cap coupling 40 onto receiver flange 14.

Figure 21:
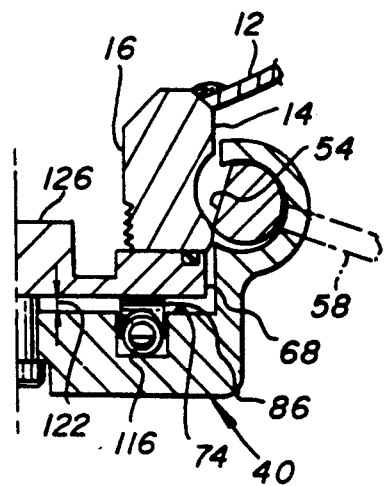

FIG. 21 illustrates the situation where plug 18 is altogether missing and an operator attempts to install cap coupling 40 over receiver flange 14. It should be noted that if the operator attempts to rotate to the right the cap coupling 40, the plug checker plate 68 also rotates simultaneously as the female drive member 130 of plug 18 is missing to prevent the rotation thereof. Therefore, clearance 122 between plug checker plate 68 and bottom 74 of cap coupling 40 remains despite continuous rotation of cap coupling 40. Once again, due to the clearance, cam lever 58 again cannot be rotated to assume the locking position and safety cap S cannot be mounted on flange 14. This unique characteristic of safety cap S functions as a check for plug 18 which may have accidentally been removed or not installed initially. In addition, the safety cap S further insures the proper seating and securing of plug 18 in the receiver flange to prevent any accidental dislodging of the plug during transporting of containers from one location to another.

When it is desired to drain the fluid from the container, safety cap S is removed from the container bottom by turning cam levers 56 and 58 in the direction indicated by arrows X and Y in FIG. 3, and typically, the cap will drop off. It should be noted that plug 18, however, would remain in the non-flow position due to the secure interfastening of threads 26 and 28. Then, dry disconnect coupling D is placed over receiver flange 14 and pushed up, while turning plug drive knob 184 to the right until male drive member 170 is received and locked in female drive member 130. Once the dry disconnect coupling D is properly seated over receiver flange 14, the cam levers 162 and 164 may then be turned towards one another to be in locking position, to thereby lock coupling 136 onto receiver flange 14. (It should be noted that the relative position of cam levers 162 and 164 may be reversed such that the locking position thereof is obtained by turning them away from each other, if so desired.)

In order to open the fluid path from container C to inside of the disconnect coupling D and to the exit arm 140, both drive knobs 184 and 186 are turned simultaneously to the left, until threads 188 on valve drive knob 186 completely disengage from threads 190 and plug threads 26 disengage from threads 28 in flange 14, (preferably, four complete revolutions), and then pulled down as shown in FIG. 14. This causes plug 18 to assume the fluid flow position and, as shown in FIG. 14, the fluid begins to flow from inside of container C to exit opening 142 via plug recesses 36 and inside recess 138 of coupling 136.

In order to terminate the fluid flow, drive knobs 184 and 186 are simply pushed up and turned to the right simultaneously, until valve drive knob 186 is completely screwed on valve guide 192 and becomes stationary. Plug drive knob 184 is, however, continued to turn, preferably by one to two additional complete revolutions, in order to insure that plug 18 is secure in receiver flange 14 and is properly seated therein. If desired, the dry disconnect coupling D may then be removed by turning cam levers 162 and 164 to unlock position and safety cap S may then be replaced onto receiver flange 14, as described above.

A critical and unique feature of the present invention lies in the specific configuration of plug 18 that allows it to assume the emergency non-flow position. In particular, if the dry disconnect coupling D is removed accidentally or otherwise, while plug 18 is still in the flow position (FIG. 14), the plug will slide downwardly in sleeve channel 16 until its top section 20 engages receiver flange opening 34 to thereby seal it and any inadvertent or accidental spill of the fluid would effectively be averted (FIG. 11).

It should be noted that the provision of separate knobs for the plug and valve drives is significant in that it attains an important objective when the fluid flow is being terminated and plug 18 reverts to the non-flow position. More specifically, when the drive knobs 184 and 186 are rotated to the right simultaneously, valve drive knob 186 becomes stationary after it is completely screwed onto the valve guide 192. However, plug drive knob 184 may be rotated further to insure that plug 18 is secure in receiver flange 14 and is tightly fastened thereto. This prevents the possibility that plug 18 has not been completely fastened and therefore not secure in flange 14, while valve drive knob 186 is completely secure and tight on valve guide 192.

This situation could arise where the length of threads 26 does not coincide with the length of threads 188, and especially where the latter is relatively shorter. The valve drive knob 186, in this instance, could be tightened, leaving plug 18 loose in receiver flange 14. One reason for the difference in lengths of the threads is that it has been found to be difficult to match precisely the beginning or the end of threads during machining, which results in unequal lengths of the threads. The beginning or end of the threads may be off by as much as 90 degrees on two different objects. Secondly, even if the threads substantially match in the beginning, the continued use and wear of the objects causes loosening of the threads leading to misalignment and play and the two can not be tightened to the same initial point. Accordingly, it is critical that plug drive knob 184 is further rotated, preferably by 1 to 2 revolutions, after valve drive knob 186 becomes stationary, i.e., is tightened on valve guide 192.

The operation of safety cap SS is similar to safety cap S, as described above, with the exception of clamping arms 304 and 306. Under the normal circumstances, where plug 354 has been screwed in and is seated properly in the receiver flange 327 so as to be in proper alignment therewith as shown in FIG. 24, and coupling 300 is rotated to the right, clamp arms 304 and 306 would easily wrap around flanges 332 and 334. However, if plug 354 is either absent from the receiver flange or has not been screwed in up to a desired point therein, there would be a clearance between checker plate 344 and the inside bottom surface of coupling 300 (similar to the clearance 122 in safety cap S described above), which would prevent keys 336 and 338 to properly mate with tabs 340 and 342, and the flanges 332 and 334 cannot therefore be received in grooves 326 of clamping arms 304 and 306. This would further prevent the arms to completely wrap around flanges 332 and 334. Due to this insufficient wrapping-around of arms 310 and 312, the holes 304 and 306 therein would not match and locking pin 324 cannot be inserted.

This unique characteristic of safety cap SS functions as a check for plug 354 and the proper seating and securing thereof in the receiver flange in a manner described above with respect to safety cap S.

The safety cap SS can be easily removed from the container bottom by pulling out lock pin 324 from passageway 322 and merely pulling free ends 314 and 316 of clamping arms 304 and 306, respectively, away from each other about hinge pin 308, until they are no longer in engagement with shoulder flanges 332 and 334. Typically, the cap will drop off. The plug 354, however, would remain in the non-flow position due to the secure interfastening of threads 376 and 378. The dry disconnect coupling DD may then be placed over receiver flange 327 and pushed to a sufficient degree until head 458 of retainer pin 454 is securely in place within dome-recess 382, and tabs 446 and 448 are properly received in corresponding keys 442 and 444. The left and right clamp arms 408 and 410 are then wrapped around shoulder flanges 438 and 440, and lock pin 428 is pushed up to be received in aligned holes 422 and 424.

The lock pin 428 causes clamp arms to lock on and hold coupling 400 to the receiver flange. It should be noted that until safety lock pin 428 is raised into the holes in clamp arms 408 and 410, plug 354 cannot be rotated to assume the flow position. This is due to the construction that clamp arms 408 and 410 cannot properly wrap around shoulder flanges 438 and 440 until the keys 442, 444 and tabs 446 and 448 mate properly. On the other hand, due to the improper or insufficient mating of the keys and tabs, head 458 of retainer pin 454 cannot be inserted to a sufficient degree to be received in recess 382 of plug 354, and the rotation of plug drive 450 is therefore prevented. Therefore, unless the clamping arms 408 and 410 securely wrap around flanges 438 and 440 so that their holes 422 and 424 are aligned to receive pin 428, plug 354 cannot be rotated to assume the flow position.

The lock pin 428, as shown in FIGS. 32 and 35, is kept in the raised position by lock ring 486. Once coupling DD is properly seated over the receiver flange, and lock pin 428 is raised in passageway 426, knob 472 is turned in the direction of arrow XX, shown in FIG. 32, until abutment pin 484 engages inclined tab 490 of the knob. As the knob 472 is further rotated, pin 484 now rotates lock ring 486 until pin 484 passes by underneath tab 490 as knob 472 spirals downwardly. The lock ring 486 is now positioned so that lock pin 428 rests thereon and is locked in the up position (FIG. 32). In this position, the dry disconnect coupling DD cannot be removed from the receiver flange 327 as pin 428 interlocks clamping arms 408 and 410 together. Accordingly, this arrangement prevents accidental removal of the dry disconnect coupling DD when the plug is in the flow position.

It should be noted that as knob 472 spirals downwardly, plug drive valve 450 unscrews plug 354 from the receiver flange 327 due to the interlocking engagement between male drive member 452 and female drive member or recess 380 of the plug, shown in FIG. 26. Once plug threads 376 completely disengage from receiver flange thread 378, knob 472 may simply be pulled down until platform member 500 rests on upper surface 502 of valve guide 478. This causes plug 354 to assume the fluid flow position, and, as shown in FIG. 26, the fluid begins to flow from the inside of container C to the exterior through exit arm opening 406 via plug recesses 374 and inside recess 402 of coupling 400.

In order to terminate the fluid flow, knob 472 is turned to the right (opposite to the direction of arrow XX) and as knob 472 spirals upwardly toward lock ring 486, tab 490 engages pin 484 and springs out of the rotating path of knob 472, shown in FIG. 34. The abutment pin 484, as shown in FIG. 33, now engages vertical tab 488 and rotates lock ring 486 to the right so that it no longer supports lock pin 428 thereon, and lock pin 428 can then be lowered to be received in notch 482. It should be noted that while knob 472 is being rotated to the right, plug-drive valve 450 rotates plug 354 upwardly until threads 376 are in full engagement with threads 378 of the receiver flange.

A critical and unique feature of the dry disconnect coupling DD lies in the specific arrangement of lock pin being received in the knob notch 482. When the lock pin 428 is resting in the position shown in FIG. 31, knob 472 cannot be rotated in either direction. This prevents accidental spills in the instance where plug 354 might be absent from the receiver flange.

While this invention has been described as having the preferred designs, it is understood that it is capable of further modifications, uses and/or adaptions of the invention and following in general the principles of the invention and including such departures from the present disclosure as come within known or customary practice in the art to which the invention pertains, and as may be applied to essential features hereinbefore set forth, and fall within the scope of invention or the limits of the claims appended hereto.

What is claimed is:

1. A dry disconnect coupling for draining fluid from a container, comprising:
   fitting means for mounting to the drain of the container;
   plug means movably secured in said fitting means and having a first flow position and a second non-flow position;
   first coupling means engageable with said fitting means and cooperating with said plug means;
   said first coupling means including actuating means for causing said plug means to assume said first flow position or said second non-flow position;
   said first coupling means including plug drive means for said plug means;
   said plug drive means having a plug engaging and a plug non-engaging position;
   said first coupling means including valve means cooperating with said plug drive means;
   each of said plug drive means and said valve means including rotating means for causing axial translation of said plug drive means and said valve means relative to said first coupling means and to each other; and
   means for permitting said plug drive means to rotate when said valve means is stationary to thereby permit proper alignment and seating of said plug means in said drain when said plug means is moved to said second non-flow position.

2. The coupling of claim 1, further comprising:
   means for locking said first coupling means with said fitting means.

3. The coupling of claim 2, wherein:
   said locking means includes cam means engageable with a corresponding groove.

4. The coupling of claim 3, wherein:
   said groove is disposed on said fitting means and said cam is positioned on said first coupling means.

5. The coupling of claim 1, wherein:
   said first coupling means is generally cup-shaped and includes an exit port opening to the exterior.

6. The coupling of claim 5, wherein:
   said valve and said plug drive means are positioned centrally within said cup-shaped coupling means and extend vertically in coaxial relationship therewith.

7. The coupling of claim 6, wherein:
   said valve includes a generally circular platform member at a first end thereof and said rotating means at another end thereof; and
   said platform member substantially seals the opening of said cup-shaped coupling means when said plug means assumes said second non-flow position.

8. The coupling of claim 7, wherein:
   said plug drive means includes a male drive member at a first end thereof and said rotating means at a second end thereof; and
   said male drive member protrudes beyond said platform member.

9. The coupling of claim 8, wherein:
   said plug means includes a female drive member adjacent a first end thereof for receiving said male drive member and to be in tight fitting engagement therewith.

10. The coupling of claim 9, wherein:

said male and female drive members are generally square in cross-section.

11. The coupling of claim 10, wherein:
said rotating means of each said plug drive means and said valve are disposed externally of said cup-shaped coupling means; and
said plug means, said plug drive means, said valve, said platform and said rotating means, when fitted together, all have a common central axis so that when said rotating means are actuated, said plug means, said plug drive means, said valve and said platform translate axially relative to said first coupling means.

12. The coupling of claim 10, wherein:
said female drive member is slightly larger in size than said male drive member.

13. The coupling of claim 10, wherein:
said male drive member is slightly twisted.

14. The coupling of claim 9, wherein: said fitting means including a sleeve defines therein a central passage extending between the ends thereof;
a first end of said passage is in fluid communication with the drain of the container and a second end thereof is in fluid communication with said first coupling means; and
said passage and the drain form a continuous flow path for the fluid from the drain to said first coupling means, and when said plug means assumes said first flow position, the fluid flows from the container to said first coupling means and to the exterior through said exit port.

15. The coupling of claim 14, wherein:
said second end of said passage is substantially sealed by said first end of said plug means, when said plug means assumes said second non-flow position.

16. The coupling of claim 1, further comprising:
a cap;
said cap including second coupling means engageable with said fitting means and cooperating with said plug means; and
said second coupling means including means for maintaining said plug means in said second non-flow position when said first coupling means has been removed.

17. The coupling of claim 16, wherein:
said second coupling means includes means for locking with said fitting means.

18. The coupling of claim 17, wherein:
said locking means includes cam means engageable with a corresponding groove.

19. The coupling of claim 18, wherein:
said groove is disposed on said fitting means and said cam is positioned on said second coupling means.

20. The coupling of claim 16, wherein:
said second coupling means includes means for securing said plug means in said fitting means.

21. The coupling of claim 20, wherein:
said plug means includes a plug;
said plug securing means includes a generally circular plate having top and bottom surfaces;
said second coupling means defines a recess therein; and
said plate is removably secured in said recess and is rotatable therein; and
said plate is disposed so as to be movable along a central axis thereof relative to said second coupling means.

22. A safety closure cap for a fluid container, comprising:
fitting means for mounting to the drain of the container;
plug means movably secured in said fitting means;
coupling means engageable with said fitting means and cooperating with said plug means;
said coupling means defining a recess therein; and
said coupling means including means for securing said plug means against rotation in said fitting means.

23. The cap of claim 22, wherein:
said coupling means includes means for locking with said fitting means.

24. The cap of claim 23, wherein:
said locking means includes cam means engageable with a corresponding groove.

25. The cap of claim 24, wherein:
said groove is disposed on said fitting means and said cam means is positioned on said coupling means.

26. The cap of claim 22, wherein:
said plug means includes a plug;
said plug securing means includes a generally circular plate removably secured in said recess of said coupling means;
said coupling means and said plate are rotatable relative to each other; and
said plate is movable along a vertical central axis thereof relative to said coupling means.

27. The cap of claim 26, wherein:
said plate includes top and bottom surfaces and a male drive member on said top surface; and
said plug includes a female drive member adjacent one end thereof for receiving said male drive member and for being in tight engagement therewith.

28. The cap of claim 27, wherein:
the inside bottom of said coupling means includes two generally diametrically opposed grooves; and
each said groove includes a ramp sloping downwardly from one end thereof.

29. The cap of claim 28, further comprising:
two diametrically opposed cam-wedges disposed on the bottom surface of said plate for being received in corresponding grooves in the inside bottom of said coupling means and for engaging with respective ramps; and
spring means biased between each said cam-wedge and the other end of the corresponding groove.

30. The cap of claim 29, wherein:
said plate includes an up position and a down position;
said plate assumes said up position when said coupling means is rotated in a first direction relative to said plate; and
said plate assumes said down position when said coupling means is rotated in a second direction relative to said plate;
whereby when said plate assumes said up position said cam-wedges ride up their corresponding ramps and when said plate assumes said down position said cam-wedges ride down their corresponding ramps.

31. The cap of claim 29, wherein:
said male drive member is disposed generally vertically on the top surface of said plate; and
said female drive member is disposed generally vertically on said plug means adjacent said one end thereof:

whereby a continuous rotation of said coupling means causes simultaneous rotation of said plate until said plug is securely in place in said fitting means and then a continued rotation of said coupling means in the same direction causes said cam-wedges to ride down the corresponding ramps so that said plate assumes said down position.

32. A dry disconnect coupling for draining fluid from a container, comprising:
fitting means for mounting to the drain of the container;
plug means movably secured in said fitting means and having a first flow position and a second non-flow position;
first coupling means engageable with said fitting means and cooperating with said plug means;
said first coupling means including actuating means for causing said plug means to assume said first flow position or said second non-flow position;
said first coupling means including plug drive means for said plug means;
said plug drive means having a plug engaging and a plug non-engaging position;
said first coupling means including valve means cooperating with said plug drive means; and
said valve means including rotating means for causing axial translation of said plug drive means relative to said first coupling means.

33. The coupling of claim 32, further comprising:
means for locking said first coupling means with said fitting means.

34. The coupling of claim 33, wherein:
said locking means includes clamping means.

35. The coupling of claim 34, wherein:
said clamping means includes at least one grooved member.

36. The coupling of claim 35, wherein:
one of said first coupling means and said fitting means includes a flange member;
said at least one grooved member is mounted on the other of said first coupling means and said fitting means; and
said flange member is received in said at least one grooved member for thereby releasably locking said first coupling means with said fitting means.

37. The coupling of claim 35, wherein:
said at least one grooved member is generally semicircular in configuration.

38. The coupling of claim 32, wherein:
said first coupling means is generally cup-shaped and includes an exit port opening to the exterior.

39. The coupling of claim 38, wherein:
said valve means and said plug drive means are positioned centrally within said cup-shaped coupling means and extend vertically in coaxial relationship therewith.

40. The coupling of claim 39, wherein:
said valve means includes a generally circular platform member at a first end thereof and said rotating means at another end thereof; and
said platform member substantially seals the opening of said cup-shaped coupling means when said plug means assumes said second non-flow position.

41. The coupling of claim 32, wherein:
one of said plug drive means and said plug means includes a male drive member; and
the other of said plug drive means and said plug means includes a female drive member for receiving said male drive member and to be in tight engagement therewith.

42. The coupling of claim 32, wherein:
said valve means includes means for releasably locking with said plug means.

43. The coupling of claim 42, wherein:
said locking means includes pin means with a bifurcated section;
said plug means includes a recess adjacent a first end thereof for releasably receiving said bifurcated section and to be in tight fitting engagement therewith.

44. The coupling of claim 38, wherein:
said rotating means is disposed externally of said cup-shaped coupling means; and
said plug means, said plug drive means, said valve means, and said rotating means, when fitted together, all have a common central axis so that when said rotating means is actuated, said plug means, said plug drive means, and said valve means translate axially relative to said first coupling means.

45. The coupling of claim 38, wherein:
said fitting means including a sleeve defines therein a central passage extending between the ends thereof;
a first end of said passage is in fluid communication with the drain of the container and a second end thereof is in fluid communication with said first coupling means; and
said passage and the drain form a continuous flow path for the fluid from the drain to said first coupling means, and when said plug means assumes said first flow position, the fluid flows from the container to said first coupling means and to the exterior through said exit port.

46. The coupling of claim 45, wherein:
said second end of said passage is substantially sealed by said plug means, when said plug means assumes said second non-flow position.

47. The coupling of claim 32, further comprising:
a cap;
said cap including second coupling means engageable with said fitting means and cooperating with said plug means; and
said second coupling means including means for maintaining said plug means in said second non-flow position when said first coupling means has been removed.

48. The coupling of claim 47, wherein:
said second coupling means includes means for locking with said fitting means.

49. The coupling of claim 48, wherein: said locking means includes clamping means; and
said clamping means includes at least one grooved member.

50. The coupling of claim 49, wherein:
said at least one grooved member is generally semicircular in configuration;
one of said second coupling means and said fitting means includes a flange member;
said grooved member is mounted on the other of said second coupling means and said fitting means;
said flange member is received in said grooved member for thereby releasably locking said second coupling means with said fitting means.

51. The coupling of claim 47, wherein:

said second coupling means includes means for securing said plug means in said fitting means.

52. The coupling of claim 51, wherein:
said plug means includes a plug;
said plug securing means includes a generally circular plate having top and bottom surfaces;
said second coupling means defines a recess therein; and
said plate is removably secured in said recess and is rotatable therein; and
said plate is disposed so as to be movable along a central axis thereof relative to said second coupling means.

53. A dry disconnect coupling for draining fluid from a container, comprising:
fitting means for mounting to the drain of the container;
plug means movably secured in said fitting means and having a first flow position and a second non-flow position;
coupling means engageable with said fitting means and cooperating with said plug means;
said coupling means including actuating means for causing said plug means to assume said first flow position or said second non-flow position;
said coupling means including plug drive means for said plug means;
said plug drive means having a plug engaging and a plug non-engaging position;
means for releasably locking said plug drive means with said plug means; and
rotating means for causing axial translation of said plug drive means relative to said coupling means.

54. The coupling of claim 53, wherein:
said locking means includes a male member mounted on one of said plug drive means and said plug means; and
a female member disposed on the other of said plug drive means and said plug means.

55. The coupling of claim 54, wherein:
said male member includes pin means with a bifurcated portion;
said bifurcated portion is received in said female member; and
said bifurcated portion having a first locking and a second unlocking position; whereby upon actuation of either of said plug drive means or said plug means said bifurcated portion assumes said first locking or said second unlocking position.

56. The coupling of claim 53, wherein:
one of said plug drive means and said plug means includes a male member; and
the other of said plug drive means and said plug means includes a female member for receiving said male member and to be in tight engagement therewith.

57. The coupling of claim 53, further comprising:
means for locking said coupling means with said fitting means; and
said locking means includes clamping means;
said clamping means includes at least one grooved member.

58. The coupling of claim 57, wherein:
said at least one grooved member is generally semicircular in configuration;
one of said coupling means and said fitting means includes a flange member;
said grooved member is mounted on the other of said coupling means and said fitting means; and
said flange member is received in said grooved member for thereby releasably locking said coupling means with said fitting means.

59. A safety closure cap for a fluid container, comprising:
fitting means for mounting to the drain of the container;
plug means movably secured in said fitting means;
coupling means engageable with said fitting means and cooperating with said plug means;
said coupling means defining a recess therein;
said coupling means including means for securing said plug means against rotation in said fitting means;
said coupling means including means for locking with said fitting means; and
said locking means including clamping means.

60. The cap of claim 59, wherein:
said clamping means includes at least one grooved member mounted on one of said coupling means and said fitting means; and
said clamping means includes a flange member mounted on the other of said coupling means and said fitting means to be received in said grooved member.

61. The cap of claim 60, wherein:
said grooved member is generally semicircular in configuration.

62. The cap of claim 59, wherein:
said plug means includes a plug;
said plug securing means includes a generally circular plate removably secured in said recess of said coupling means;
said coupling means and said plate are rotatable relative to each other; and
said plate is movable along a vertical central axis thereof relative to said coupling means.

63. The cap of claim 62, wherein:
said plate includes top and bottom surfaces and a male drive member on said top surface; and
said plug includes a female drive member adjacent one end thereof for receiving said male drive member and for being in tight engagement therewith.

64. The cap of claim 63, wherein:
the inside bottom of said coupling means includes two generally diametrically opposed grooves; and
each said groove includes a ramp sloping downwardly from one end thereof.

65. The cap of claim 64, further comprising:
two diametrically opposed cam-wedges disposed on the bottom surface of said plate for being received in corresponding grooves in the inside bottom of said coupling means and for engaging with respective ramps; and
spring means biased between each said cam-wedge and the other end of the corresponding groove.

66. The cap of claim 65, wherein:
said plate includes an up position and a down position;
said plate assumes said up position when said coupling means is rotated in a first direction relative to said plate; and
said plate assumes said down position when said coupling means is rotated in a second direction relative to said plate;

whereby when said plate assumes said up position said cam-wedges ride up their corresponding ramps and when said plate assumes said down position said cam-wedges ride down their corresponding ramps.

67. The cap of claim 65, wherein:

said male drive member is disposed generally vertically on the top surface of said plate; and said female drive member is disposed generally vertically on said plug means adjacent said one end thereof;

whereby a continuous rotation of said coupling means causes simultaneous rotation of said plate until said plug is securely in place in said fitting means and then a continued rotation of said coupling means in the same direction causes said cam-wedges to ride down the corresponding ramps so that said plate assumes said down position.

68. The cap of claim 62, wherein:

said plug includes a generally cylindrical first section and a generally dome-shaped second section.

* * * * *